(12) United States Patent
Burger et al.

(10) Patent No.: US 10,936,316 B2
(45) Date of Patent: Mar. 2, 2021

(54) DENSE READ ENCODING FOR DATAFLOW ISA

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/013,842

(22) Filed: Feb. 2, 2016

(65) Prior Publication Data
US 2017/0083321 A1 Mar. 23, 2017

Related U.S. Application Data

(60) Provisional application No. 62/221,003, filed on Sep. 19, 2015.

(51) Int. Cl.
*G06F 9/30* (2018.01)
*G06F 9/38* (2018.01)
(Continued)

(52) U.S. Cl.
CPC ............ *G06F 9/3016* (2013.01); *G06F 9/268* (2013.01); *G06F 9/3004* (2013.01);
(Continued)

(58) Field of Classification Search
None
See application file for complete search history.

(56) References Cited

U.S. PATENT DOCUMENTS

| 5,317,734 A | 5/1994 | Gupta |
| 5,615,350 A | 3/1997 | Hesson |

(Continued)

FOREIGN PATENT DOCUMENTS

| CN | 103377085 A | 10/2013 |
| EP | 0 583 089 A2 | 2/1994 |

(Continued)

OTHER PUBLICATIONS

Sankaralingam et al., "Distributed Microarchitectural Protocols in the TRIPS Prototype Processor", Dec. 2006, Distributed microarchitectural protocols in the TRIPS prototype processor. In Microarchitecture, 2006. MICRO-39. 39th Annual IEEE/ACM International Symposium on (pp. 480-491).*

(Continued)

*Primary Examiner* — John M Lindlof
(74) *Attorney, Agent, or Firm* — Klarquist Sparkman, LLP

(57) ABSTRACT

Apparatus and methods are disclosed for controlling execution of memory access instructions in a block-based processor architecture using an instruction decoder that decodes instructions having variable numbers of target operands. In one example of the disclosed technology, a block-based processor core includes an instruction decoder configured to decode target operands for an instruction in an instruction block, the instruction being encoded to allow for a variable number of target operands and a control unit configured to send data for at least one of the decoded target operands for an operation performed by the at least one of the cores. In some examples, the instruction indicates target instructions with a vector encoding. In other examples, a variable length format allows for the indication of one or more targets.

22 Claims, 16 Drawing Sheets

(51) Int. Cl.

| | | |
|---|---|---|
| *G06F 9/46* | (2006.01) | |
| *G06F 9/52* | (2006.01) | |
| *G06F 11/36* | (2006.01) | |
| *G06F 15/78* | (2006.01) | |
| *G06F 9/26* | (2006.01) | |
| *G06F 9/32* | (2018.01) | |
| *G06F 9/345* | (2018.01) | |
| *G06F 9/35* | (2018.01) | |
| *G06F 12/0806* | (2016.01) | |
| *G06F 12/0862* | (2016.01) | |
| *G06F 12/1009* | (2016.01) | |
| *G06F 13/42* | (2006.01) | |
| *G06F 15/80* | (2006.01) | |
| *G06F 9/355* | (2018.01) | |
| *G06F 12/0811* | (2016.01) | |
| *G06F 12/0875* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30138* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3828* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/00* (2018.01)

(56) References Cited

U.S. PATENT DOCUMENTS

| | | |
|---|---|---|
| 5,669,001 A | 9/1997 | Moreno |
| 5,729,228 A | 3/1998 | Franaszek et al. |
| 5,790,822 A | 8/1998 | Sheaffer et al. |
| 5,796,997 A | 8/1998 | Lesartre et al. |
| 5,845,103 A | 12/1998 | Sodani et al. |
| 5,905,893 A | 5/1999 | Worrell |
| 5,943,501 A | 8/1999 | Burger et al. |
| 6,016,399 A | 1/2000 | Chang |
| 6,061,776 A | 5/2000 | Burger et al. |
| 6,119,222 A | 9/2000 | Shiell et al. |
| 6,161,170 A | 12/2000 | Burger et al. |
| 6,164,841 A | 12/2000 | Mattson et al. |
| 6,178,498 B1 | 1/2001 | Sharangpani et al. |
| 6,240,510 B1 | 5/2001 | Yeh et al. |
| 6,279,106 B1 | 8/2001 | Roberts |
| 6,282,708 B1 | 8/2001 | Augusteijn et al. |
| 6,314,493 B1 | 11/2001 | Luick |
| 6,463,524 B1 | 10/2002 | Delaney |
| 6,493,820 B2 | 12/2002 | Akkary et al. |
| 6,529,922 B1 | 3/2003 | Hoge |
| 6,662,294 B1 | 12/2003 | Kahle et al. |
| 6,892,292 B2 | 5/2005 | Henkel et al. |
| 6,898,696 B1 | 5/2005 | Cheong et al. |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,085,919 B2 | 8/2006 | Grochowski et al. |
| 7,095,343 B2 | 8/2006 | Xie et al. |
| 7,299,458 B2 | 11/2007 | Hammes |
| 7,302,543 B2 | 11/2007 | Lekatsas et al. |
| 7,380,038 B2 | 5/2008 | Gray |
| 7,624,386 B2 | 11/2009 | Robison |
| 7,676,650 B2 | 3/2010 | Ukai |
| 7,676,669 B2 | 3/2010 | Ohwada |
| 7,836,289 B2 | 11/2010 | Tani |
| 7,853,777 B2 | 12/2010 | Jones et al. |
| 7,877,580 B2 | 1/2011 | Eickemeyer et al. |
| 7,917,733 B2 | 3/2011 | Kazuma |
| 7,970,965 B2 | 6/2011 | Kedem et al. |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,312,452 B2 | 11/2012 | Neiger et al. |
| 8,321,850 B2 | 11/2012 | Bruening et al. |
| 8,433,885 B2 | 4/2013 | Burger et al. |
| 8,447,911 B2 | 5/2013 | Burger et al. |
| 8,464,002 B2 | 6/2013 | Burger et al. |
| 8,583,895 B2 | 11/2013 | Jacobs et al. |
| 8,677,105 B2 | 3/2014 | Abdallah |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 2001/0032308 A1 | 10/2001 | Grochowski et al. |
| 2002/0016907 A1 | 2/2002 | Grochowski et al. |
| 2003/0023959 A1 | 1/2003 | Park |
| 2004/0083468 A1 | 4/2004 | Ogawa et al. |
| 2004/0216095 A1 | 10/2004 | Wu |
| 2005/0172277 A1 | 8/2005 | Chheda et al. |
| 2005/0204348 A1 | 9/2005 | Horning et al. |
| 2006/0090063 A1 | 4/2006 | Theis |
| 2006/0149944 A1 | 7/2006 | Eisen et al. |
| 2007/0239975 A1 | 10/2007 | Wang |
| 2007/0288733 A1 | 12/2007 | Luick |
| 2008/0109637 A1 | 5/2008 | Martinez et al. |
| 2009/0013135 A1 | 1/2009 | Burger et al. |
| 2009/0013160 A1 | 1/2009 | Burger et al. |
| 2009/0106541 A1 | 4/2009 | Mizuno et al. |
| 2009/0144502 A1 | 6/2009 | Pechanek |
| 2009/0158017 A1 | 6/2009 | Mutlu et al. |
| 2009/0172371 A1 | 7/2009 | Joao et al. |
| 2010/0146209 A1 | 6/2010 | Burger et al. |
| 2010/0161948 A1 | 6/2010 | Abdallah |
| 2010/0191943 A1 | 7/2010 | Bukris |
| 2010/0312991 A1 | 12/2010 | Norden et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0202749 A1 | 8/2011 | Jin et al. |
| 2012/0158647 A1 | 6/2012 | Yadappanavar et al. |
| 2012/0204008 A1* | 8/2012 | Dockser ............... G06F 9/3802 712/208 |

(56) References Cited

U.S. PATENT DOCUMENTS

| | | |
|---|---|---|
| 2012/0303933 A1 | 11/2012 | Manet et al. |
| 2012/0311306 A1 | 12/2012 | Mushano |
| 2013/0185523 A1 | 7/2013 | Wang et al. |
| 2013/0198499 A1 | 8/2013 | Dice et al. |
| 2014/0006714 A1 | 1/2014 | Cherukuri et al. |
| 2014/0006752 A1 | 1/2014 | Morrow et al. |
| 2014/0089591 A1 | 3/2014 | Moir et al. |
| 2014/0181475 A1 | 6/2014 | Abdallah |
| 2014/0189239 A1 | 7/2014 | Hum et al. |
| 2014/0372736 A1 | 12/2014 | Greenhalgh |
| 2015/0067662 A1 | 3/2015 | Palalau |
| 2015/0089202 A1 | 3/2015 | Qiu et al. |
| 2015/0100757 A1 | 4/2015 | Burger et al. |
| 2015/0127928 A1 | 5/2015 | Burger et al. |
| 2015/0186293 A1 | 7/2015 | Lin |
| 2015/0199199 A1 | 7/2015 | Burger et al. |
| 2017/0083320 A1 | 3/2017 | Burger et al. |
| 2017/0083322 A1 | 3/2017 | Burger et al. |

FOREIGN PATENT DOCUMENTS

| | | |
|---|---|---|
| JP | 2001175473 A | 6/2001 |
| JP | 2002149401 A | 5/2002 |
| JP | 2013500539 A | 1/2013 |
| WO | WO 2014/193878 | 12/2014 |

OTHER PUBLICATIONS

International Search Report and Written Opinion for PCT/US2016/051416, dated Dec. 15, 2016, 10 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Ipek et al., "Core Fusion: Accommodating Software Diversity in Chip Multiprocessors", In Proceedings of the 34th annual international symposium on Computer architecture, Jun. 9, 2007, 12 pages.

Kavi, et al., "Concurrency, Synchronization, Speculation—the Dataflow Way", In Journal of Advances in Computers, vol. 96, Nov. 23, 2013, pp. 1-41.

Kim, et al., "Elastic Threads on Composable Processors", In Technical Report TR-2006-09, Aug. 2006, pp. 1-18.

Li et al., "Hybrid Operand Communication for Dataflow Processors," document not dated, 10 pages (also published as Li et al., "Hybrid operand communication for dataflow processors," In Workshop on Parallel Execution of Sequential Programs on Multi-core Architectures, pp. 61-71 (2009)).

Liu, "Hardware Techniques to Improve Cache Efficiency", In Dissertation of the University of Texas at Austin, May 2009, 189 pages.

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.

Pengfei et al., "M5 Based EDGE Architecture Modeling", In Proceedings of IEEE International Conference on Computer Design, Oct. 3, 2010, pp. 289-296.

Pierce et al., "Wrong-Path Instruction Prefetching", In Proceedings of the 29th Annual IEEE/ACM International Symposium on Microarchitecture, Dec. 2, 1996, pp. 1-17.

Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.

Roesner, "Counting Dependence Predictors," In Undergraduate Honors Thesis, May 2, 2008, 25 pages.

Sibi et al., "Scaling Power and Performance via Processor Composability," University of Texas at Austin technical report no. TR-10-14 (2010), 20 pages.

Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.

Souza et al., "Dynamically Scheduling VLIW Instructions", In Journal of Parallel and Distributed Computing, vol. 60, Jul. 2000, pp. 1480-1511.

Tamches et al., "Dynamic Kernel Code Optimization," In Workshop on Binary Translation, 2001, 10 pages.

Zmily, "Block-Aware Instruction Set Architecture", In Doctoral Dissertation, Jun. 2007, 176 pages.

Zmily et al., "Block-Aware Instruction Set Architecture", In Proceedings of ACM Transactions on Architecture and Code Optimization, vol. 3, Issue 3, Sep. 2006, pp. 327-357.

Zmily, et al., "Improving Instruction Delivery with a Block-Aware ISA", In Proceedings of 11th International Euro-Par Conference on Parallel Processing, Aug. 30, 2005, pp. 530-539.

PCT Chapter II Demand for International Preliminary Examination and amended claims under Article 34 submitted to the European Patent Office on Apr. 10, 2017, for PCT/US2016/051416, 5 pages.

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Design and Implementation of the TRIPS EDGE Architecture", In Proceedings of the 32nd Annual International Symposium on Computer Architecture, Jun. 4, 2005, pp. 1-41.

Burger et al., "Scaling to the End of Silicon with EDGE Architectures," In Proceedings of Computer, vol. 37, Issue 7, Jul. 1, 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

(56) References Cited

OTHER PUBLICATIONS

"Explicit Data Graph Execution", Retrieved on: Aug. 6, 2015, Available at: https://en.wikipedia.org/wiki/Explicit_Data_Graph_Execution.

Fallin, et al., "The Heterogeneous Block Architecture", In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures", In Dissertation, Aug. 2010, 244 pages.

Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).

Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

Huang, "Improving Processor Performance Through Compiler-Assisted Block Reuse," In Doctoral Dissertation, May 2000, 125 pages.

Keckler et al., "Tera-Op Reliable Intelligently Adaptive Processing System (TRIPS)," In AFRL-IF-WP-TR-2004-1514, document dated Apr. 2004, 29 Pages.

Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).

Kozumplik, et al., "TRIPS to the Semantic EDGE", Retrieved on: Sep. 22, 2015, Available at: http://vbn.aau.dk/ws/files/61072300/1212050422.pdf.

Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).

Maher, "Atomic Block Formation for Explicit Data Graph Execution Architectures", In Dissertation of Doctor of Philosophy, Aug. 2010, 185 pages.

McDonald et al., "TRIPS Processor Reference Manual," In Technical Report TR-05-19, document marked Mar. 10, 2005, 194 pages.

Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).

Melvin et al., "Enhancing Instruction Scheduling with a Block-Structured ISA," International Journal of Parallel Programming, vol. 23, No. 3, Jun. 1995, 23 pages.

Microsoft Research, "E2," document downloaded on Apr. 10, 2015 from http://research.microsoft.com/en-us/projects/e2/.

Munshi, et al., "A Parameterizable SIMD Stream Processor", In Proceedings of Canadian Conference on Electrical and Computer Engineering, May 1, 2005, pp. 806-811.

Nagarajan et al., "Critical Path Analysis of the TRIPS Architecture," In IEEE International Symposium on Performance Analysis of Systems and Software, Mar. 19, 2006, 11 pages.

Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).

Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.

Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).

Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.

Sankaralingam, "Polymorphous Architectures: A Unified Approach for Extracting Concurrency of Different Granularities", In Doctoral Dissertation of Philosophy, Aug. 2007, 276 pages.

Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.

Sethumadhavan et al., "Design and Implementation of the TRIPS Primary Memory System," In Proceedings of International Conference on Computer Design, Oct. 1, 2006, 7 pages.

Smith et al., "Compiling for EDGE Architectures," In Proceedings of International Symposium on Code Generation and Optimization, Mar. 26, 2006, 11 pages.

Smith et al., "Dataflow Predication", In Proceedings of 39th Annual IEEE/ACM International Symposium on Microarchitecture, Dec. 9, 2006, 12 pages.

Smith, "Explicit Data Graph Compilation," In Thesis, Dec. 2009, 201 pages.

Wu, et al., "Block Based Fetch Engine for Superscalar Processors", In Proceedings of the 15th International Conference on Computer Applications in Industry and Engineering, Nov. 7, 2002, 4 pages.

International Preliminary Report on Patentability Issued in PCT Application No. PCT/US2016/051416, dated Jan. 8, 2018, 6 Pages.

Written Opinion of the International Preliminary Examining Authority for PCT/US2016/051416, dated Aug. 23, 2017, pp. 1-5.

"Very Long Instruction Word", Retrieved From: http://en.wikipedia.org/wiki/Verylong_instruction_word, Feb. 13, 2013, 7 Pages.

"Final Office Action Issued in U.S. Appl. No. 14/757,944", dated Jul. 9, 2018, 18 Pages.

"Non Final Office Action Issued in U.S. Appl. No. 14/757,944", dated Sep. 21, 2017, 21 Pages.

August, et al., "A Framework for Balancing Control Flow and Predication", In IEEE/ACM 30th Annual International Symposium on Microarchitecture, Dec. 3, 1997, 12 Pages.

Chang, et al., "Using Predicated Execution to Improve the Performance of a Dynamically Scheduled Machine with Speculative Execution", In International Journal of Parallel Programming, vol. 24, Issue 3, Jun. 1996, 11 Pages.

Chuang, et al., "Predicate Prediction for Efficient Out-of-Order Execution", In Proceedings of the 17th Annual International Conference on Supercomputing, Jun. 23, 2003, 10 Pages.

Coons, et al., "Optimal Huffman Tree-Height Reduction for Instruction-Level Parallelism", In Technical Report TR-08-34, Aug. 2007, 26 Pages.

Ebcioglu, et al., "An Eight-Issue Tree-VLIW Processor for Dynamic Binary Translation", In Proceedings of the International Conference on Computer Design, Nov. 1998, 9 Pages.

Ferrante, et al., "The Program Dependence Graph and Its Use in Optimization", In Proceedings of ACM Transactions on Programming Languages and Systems, vol. 9, Issue 3, Jul. 1, 1987, 31 Pages.

Havanki, et al., "Treegion Scheduling for Wide Issue Processors", In Proceedings of the 4th International Symposium on High-Performance Computer Architecture, Feb. 1, 1998, 11 Pages.

Huh, et al., "A NUCA Substrate for Flexible CMP Cache Sharing", In Proceedings of 19th International Conference on Supercomputing, Jun. 20, 2005, 10 Pages.

Mahlke, et al., "Effective Compiler Support for Predicated Execution Using the Hyperblock", In Proceedings of the 25th Annual International Symposium on Microarchitecture, Dec. 1992, 10 Pages.

(56) References Cited

OTHER PUBLICATIONS

Mahlke, Scott Alan, "Exploiting Instruction Level Parallelism in the Presence of Conditional Branches", In Doctoral Dissertation Submitted In The Department of Electrical and Computer Engineering, Sep. 1996, 292 Pages.

Mai, et al., "Smart Memories: A Modular Reconfigurable Architecture", In Proceedings of the 27th International Symposium on Computer Architecture, Jun. 14, 2011, 11 Pages.

McDonald, et al., "The Design and Implementation of the TRIPS Prototype Chip", Retrieved From: http://www.cs.utexas.edu/-trips/talks/hotchips05.pdf, Aug. 17, 2005, 24 Pages.

Moreno, et al., "Scalable Instruction-level Parallelism through Tree-Instructions", In Proceedings of the 11th International Conference on Supercomputing, Jul. 11, 1997, 14 Pages.

Netto, et al., "Code Compression to Reduce Cache Accesses", In Technical Report—IC-03-023, Nov. 2003, 15 Pages.

Pan, et al., "High Performance, Variable-Length Instruction Encodings", In Doctoral Dissertation of Massachusetts Institute of Technology, May 2002, 53 Pages.

Parcerisa, et al., "Design of Clustered Superscalar Microarchitectures", In Thesis Submitted to Polytechnic, University of Catalunya, Barcelona (Spain), Apr. 2004, 28 Pages.

"International Search Report and Written Opinion Issued in PCT Application No. PCT/US2016/051207", dated Dec. 16, 2016, 11 Pages.

Pnevmatikatos, et al., "Guarded Execution and Branch Prediction in Dynamic ILP Processors", In Proceedings of the 21st Annual International Symposium on Computer Architecture, Apr. 1994, 11 Pages.

Quinones, et al., "Improving Branch Predication and Predicated Execution in Out-of-Order Processors", In IEEE 13th International Symposium on High Performance Computer Architecture, Feb. 10, 2007, 10 Pages.

Quinones, et al., "Selective Predicate Prediction for Out-of-Order Processors", In Proceedings of the 20th Annual International Conference on Supercomputing, Jun. 28, 2009, 9 Pages.

Ranganathan, Nitya, "Control Flow Speculation for Distributed Architectures", In Dissertation Presented to the Faculty of the Graduate School of The University of Texas at Austin, May 2009, 40 Pages.

Ross, et al., "A Hamming Distance Based VLIW/EPIC Code Compression Technique", In Proceedings of the International Conference on Compilers, Architecture, and Synthesis for Embedded Systems, Sep. 22, 2004, 8 Pages.

Sankaralingam, et al., "Universal Mechanisms for Data-Parallel Architectures", In Proceedings of the 36th International Symposium on Microarchitecture, Dec. 3, 2003, 12 Pages.

Simon, et al., "Incorporating Predicate Information Into Branch Predictors", In Proceedings of the 9th International Symposium on High-Performance Computer Architecture, Feb. 2003, 12 Pages.

Sohi, et al., "High-Bandwidth Data Memory Systems for Superscalar Processors", In Proceedings of the 4th International Conference on Architectural Support for Programming Languages and Operating Systems Homepage, Apr. 1991, 8 Pages.

Wilson, et al., "Designing High Bandwidth On-Chip Caches", In Proceedings of the 24th Annual International Symposium on Computer Architecture, Jun. 1997, 12 Pages.

Xie, et al., "A Code Decompression Architecture for VLIW Processors", In Proceedings of 34th ACM/IEEE International Symposium on Microarchitecture, Dec. 1, 2001, 10 Pages.

"Non Final Office Action Issued in U.S. Appl. No. 14/757,941", dated Jan. 11, 2019, 16 Pages.

"Final Office Action Issued In U.S. Appl. No. 14/942,345", dated Dec. 31, 2018, 14 Pages.

"Non Final Office Action Issued in U.S. Appl. No. 14/942,461", dated Jan. 18, 2019, 9 Pages.

"Final Office Action Issued in U.S. Appl. No. 14/942,557", dated Dec. 31, 2018, 16 Pages.

"Non Final Office Action Issued In U.S. Appl. No. 15/073,365", dated Dec. 4, 2018, 13 Pages.

"Final Office Action issued in U.S. Appl. No. 15/074,938", dated Dec. 3, 2018, 9 Pages.

Salzman, et al., "The Art of Debugging with GDB and DDD", In Book—The Art of Debugging with GDB and DDD, No Starch Press Publication, Sep. 2008, 27 Pages.

"Visual Basic", Retrieved from: Jinglei.com book base, Feb. 28, 2006, 1 Page.

"First Office Action and Search Report Issued in Chinese Patent Application No. 201680054462.9", dated Dec. 30, 2020, 11 Pages.

\* cited by examiner

FIG. 5
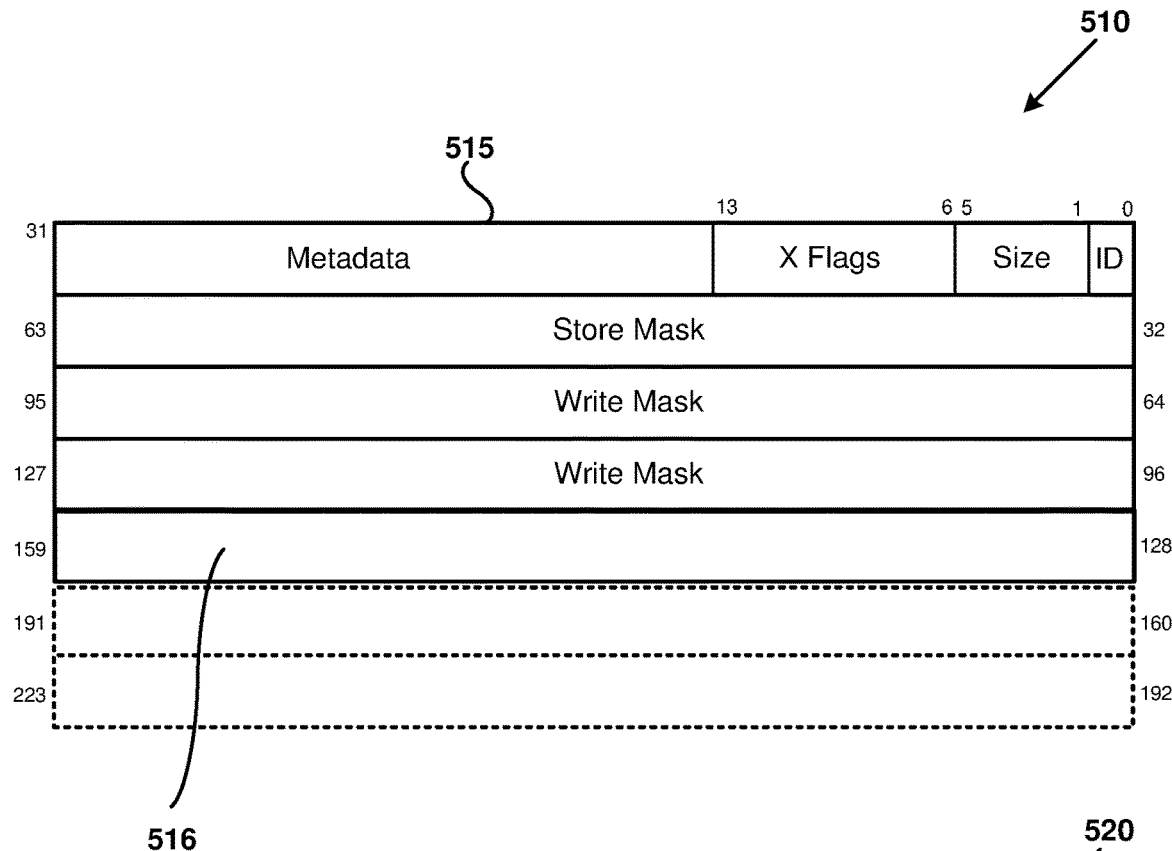
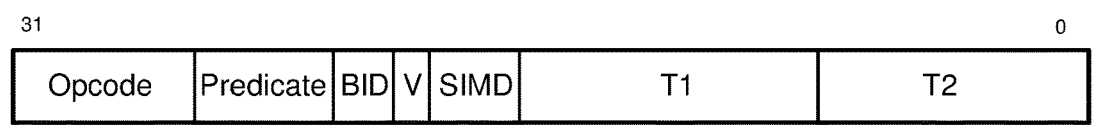
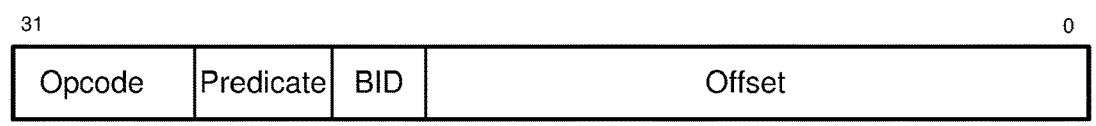
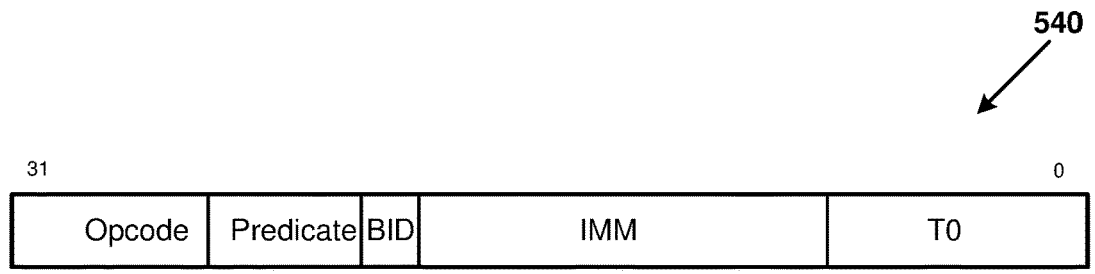

FIG. 9
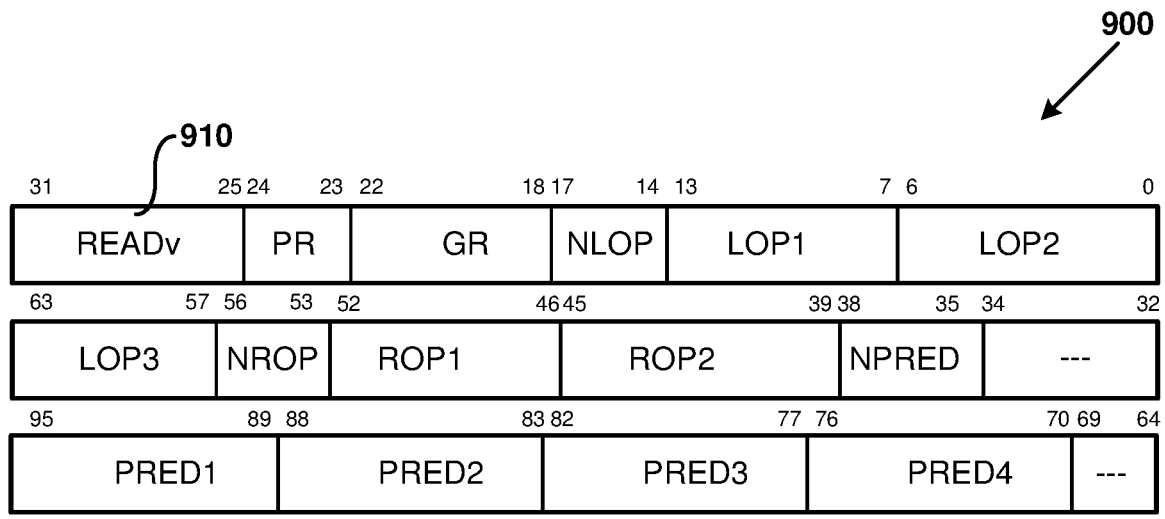
NLOP=3
NROP=2
NPRED=4
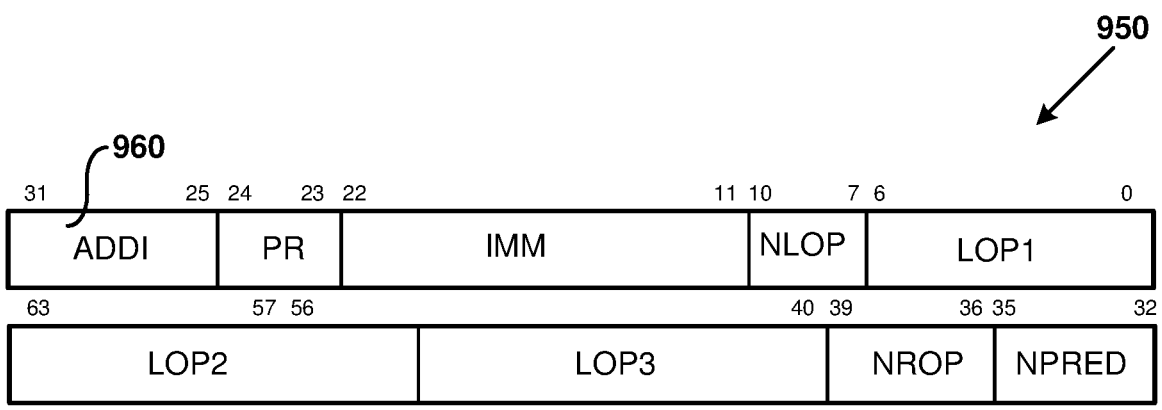
NLOP=3
NROP=0
NPRED=0

```
++i;
if(a[i]>a[i+1] {
  t     = a[i];
  a[i]  = a[i+1];
  a[i+1] = t;
} else {
  b[i]=b[i]+1;
  if(i>100) {
    x=b[i];
  } else {
    b[5]=0xff;
  }
}
```

1420

```
//   opcd   src bid    target(s)
 0: readl   R1         T[3R]  T[19R]    // i
 1: readl   R2         T[3L]             // a
 2: readl   R3         T[14R] T[21R]    // b
 3: addi    #1         B1R               // ++i
 4: add         B1R    T[5R]  T[6R]     // &a[i] (i.e., a+i)
 5: mov                T[7R]  T[8R]
 6: mov                T[12R] T[13R}
 7: ld      #0         T[9R]             // a[i]
 8: ld      #1         T[10R]            // a[i+1]
 9: mov                T[13L] T[11L]    // a[i]
10: mov                T[12L] T[11R]    // a[i+1]
11: tgt                B2P    T[14P]    // a[i] > a[i+1] ?
12: sd_t       B2P                       // a[i]   = a[i+1]
13: sd_t       B2P                       // a[i+1] = t (i.e., a[i])
14: mov                T[15L] T[19R]    // b
15: add        B1R     T[16R] T[18R]    // &b[i]
16: ld_f    #0 B2P     T[17R]            // b[i]
17: addi_f  #1 B2P     T[18L]            // b[i]+1
18: sd_f       B2P                       // b[i] = b[i]+1
19: addi    #1         T[20R] T[22R]    // ++i (duplicate)
20: tgt_f   #100 B2P   T[23P] T[26P]    // i > 100 (i<=100)
21: mov                T[22L] T[24R]    // b
22: add        B1R     T[23R] T[25R]    // &b[i]
23: ld_t    #0         R5                // x=b[i]
24: addi    #5         T[26R]            // &b[5]
25: movi    #ff        T[26L]            // 0xff
26: sd_f    #0                            // b[5]=0xff
27: bro     NEXTBLOCK                    // jump to next instruction block
```

```
++i;
if(a[i]>a[i+1] {
  t      = a[i];
  a[i]   = a[i+1];
  a[i+1] = t;
} else {
  b[i]=b[i]+1;
  if(i>100) {
    x=b[i];
  } else {
    b[5]=0xff;
  }
}
```

1430

```
//   opcd    src      target(s)
 0:  readl   R1       T[3R]   T[19R]                           // i
 1:  readl   R2       T[4L]                                    // a
 2:  readv   R3       T[15L]  T[19R]  T[22L]  T[24R]           // b
 3:  addim   #1       T[4R]   T[15R]  T[20R]  T[22R]           // ++i    (was: B1R)
 4:  addx             T[7R]   T[8R]   T[12R]  T[13R]           // &a[i]  (i.e., a+i)
 7:  ld      #0       T[13L]  T[11L]                           // a[i]
 8:  ld      #1       T[12L]  T[11R]                           // a[i+1]
11:  tgtm             T[12P]  T[13P]  T[14P]  T[16P]  T[17P]  T[18P]  T[20P]
                                                               // a[i] > a[i+1] ?  /(was: B2P)
12:  sd_t                                                      // a[i]   = a[i+1]
13:  sd_t                                                      // a[i+1] = t (i.e., a[i])
15:  add              T[16R]  T[18R]                           // &b[i]
16:  ld_f    #0       T[17R]                                   // b[i]
17:  addi_f  #1       T[18L]                                   // b[i]+1
18:  sd_f                                                      // b[i] = b[i]+1
20:  tgt_f   #100     T[23P]  T[26P]                           // i > 100 (i<=100)
22:  add              T[23R]  T[25R]                           // &b[i]
23:  ld_t    #0       R5                                       // x=b[i]
24:  addi    #5       T[26R]                                   // &b[5]
25:  movi    #ff      T[26L]                                   // 0xff
26:  sd_f    #0                                                // b[5]=0xff
27:  bro     NEXTBLOCK                                         // jump to next instruction block
```

DENSE READ ENCODING FOR DATAFLOW ISA

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, which application is incorporated herein by reference in its entirety.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

In some examples of the disclosed technology, a block-based processor includes an instruction decoder configured to decode target operands for an instruction within an instruction block. The instruction is encoded to allow for a variable number of target operands, for example, for a variable number of associated target instructions, which will receive one or more values generated by performing the operation specified by executing the instruction. The processor core further includes a control unit configured to send data for at least one of the decoded target operands for an operation performed by the instruction cores to a target instruction. In some examples, the block-based processor decodes an instruction encoded with a variable number of instruction identifiers indicating the target operands. In some examples, the decoded instruction is encoded with an instruction vector indicating the target instruction(s) to which to send the target operands.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 5 illustrates block-based processor headers and instructions, as can be used in some examples of the disclosed technology.

FIG. 9 illustrates an example variable-length instruction, as can be used in certain examples of the disclosed technology.

FIGS. 14A and 14B illustrate an example of source and assembly code, as can be used in certain examples of the disclosed technology.

DETAILED DESCRIPTION

I. General Considerations

Figure 1:
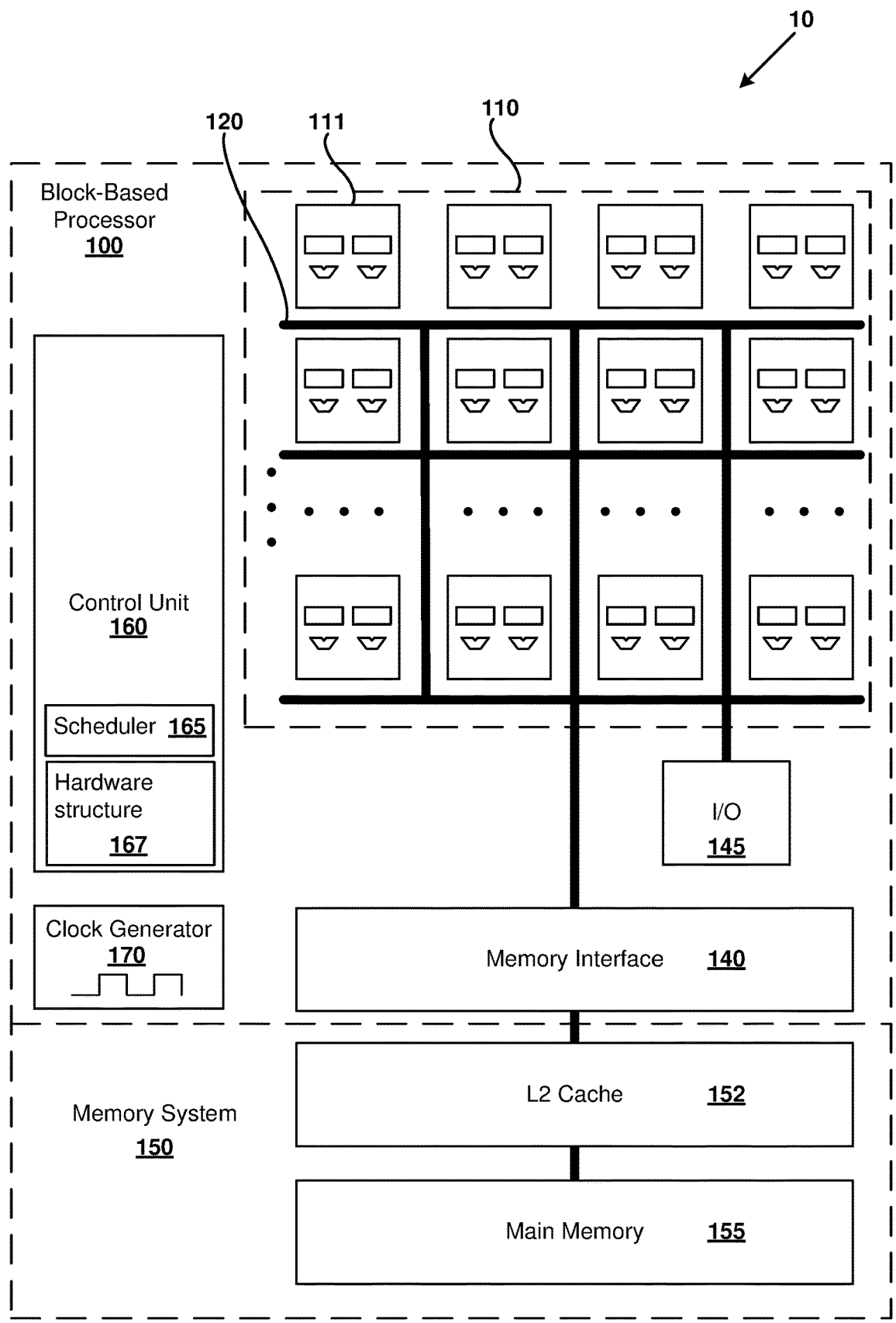
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

Apparatus, methods, and computer-readable storage media are disclosed for generation and use of block-based branch metadata for block-based processors. In certain examples of the disclosed technology, instruction blocks include an instruction block header and a plurality of instructions. In other words, the executed instructions of the instruction block affect the state, or do not affect the state as a unit.

In some examples of the disclosed technology, a hardware structure stores data indicating an execution order to be adhered to for a number of memory access instructions, including memory load and memory store instructions. A control unit coupled to a processor core control issuance of memory access instructions based at least in part on data stored in the hardware structure. Thus, memory read/write hazards can be avoided, while allowing for instructions in an instruction block to execute as soon as their dependencies are available.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. An external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 that is used to allocate instruction blocks to the processor cores 110. As used herein, scheduler block allocation refers to directing operation of an instruction blocks, including initiating instruction block mapping, fetching, decoding, execution, committing, aborting, idling, and refreshing an instruction block. Further, instruction scheduling refers to scheduling the issuance and execution of instructions within an instruction block. For example based on instruction dependencies and data indicating a relative ordering for memory access instructions, the control unit 160 can determine which instruction(s) in an instruction block are ready to issue and initiate issuance and execution of the instructions. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 165 schedules the flow of instructions including allocation and de-allocation of cores for performing instruction processing, control of input data and output data between any of the cores, register files, the memory interface 140, and/or the I/O interface 145. The control unit 160 also includes memory access instruction hardware structure 167, which can be used to store data including data indicating a relative ordering for executing memory access instructions, such as a store mask or store counter, and a store vector register, which stores data indicating which instructions (e.g., which load and/or store instructions) have executed within an instruction block, as discussed in further detail below.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
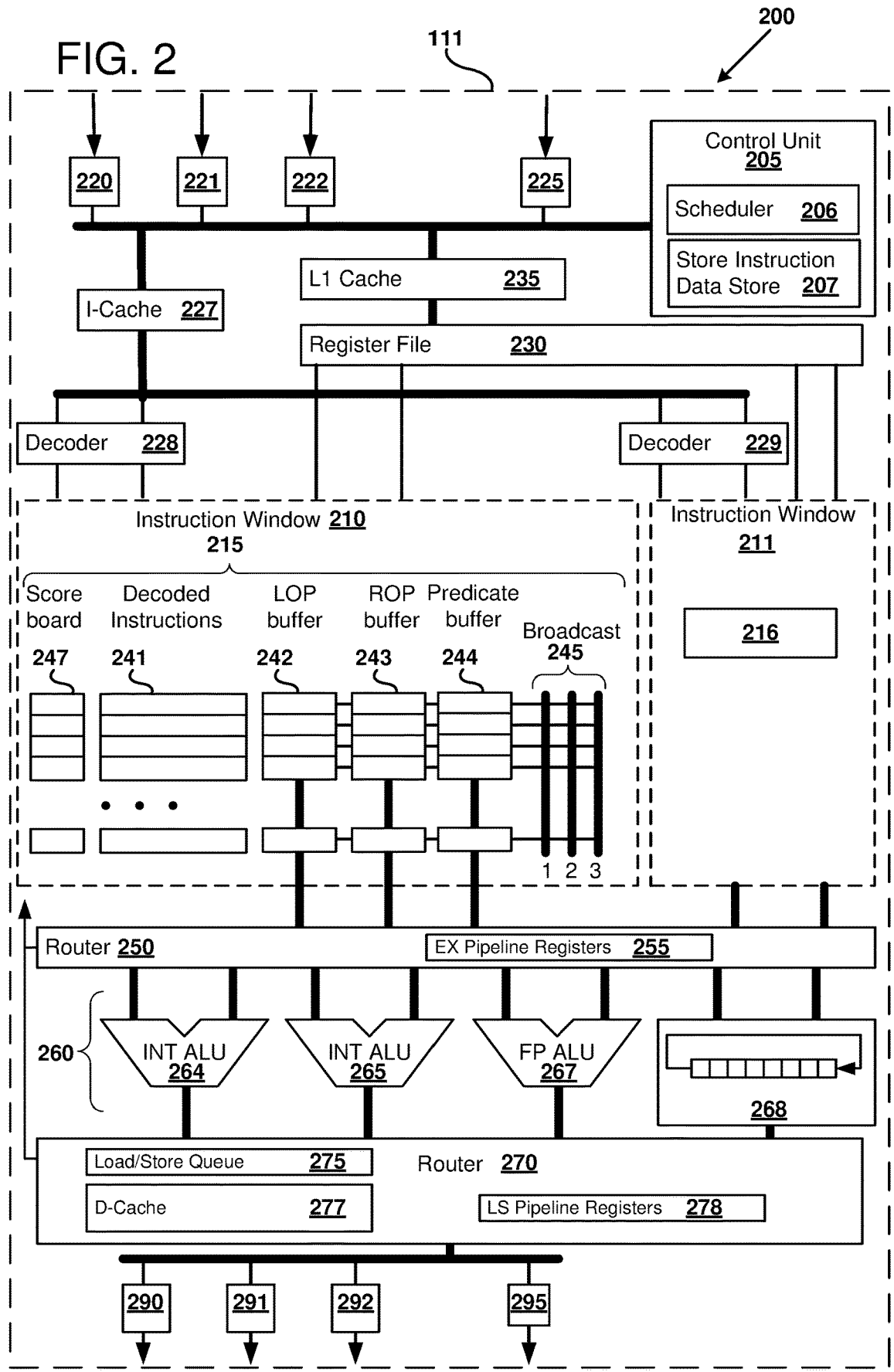
FIG. 2 illustrates a block-based processor core, as can be used in some examples of the disclosed technology.

FIG. 2 is a block diagram further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include generating and using generating and using memory access instruction encodings, allocation and de-allocation of cores for performing instruction processing, control of input data and output data between any of the cores, register files, the memory interface 140, and/or the I/O interface 145.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 205 further includes memory (e.g., in an SRAM or register) for storing control flow information and metadata. For example, data indicating memory access instruction relative ordering can be stored in a hardware structure such as a store instruction data store 207. The store instruction data store 207 can store data for a store mask (e.g., generated by copying data encoded in an instruction block or by an instruction decoder when decoding instructions), store count data (e.g., data indicating a number of memory stores to be executed before a particular next instruction can issue), a store counter (e.g., a counter storing data that indicates the number of store instructions that have issued or executed), a store vector register (e.g., storing data indicating which and what types of memory access instructions have executed), and masked store vector register data (e.g., data generated by applying the store mask to the store vector register). In some examples, the store instruction data store 207 includes a counter that tracks the number and type of memory access instructions that have executed. In some examples, the store instruction data store 207 stores data in a table (e.g. a multi-dimensional table) indicating instruction identifiers, predicates, predicate paths, number of load/stores, or other information that can be used to determine a relative ordering of execution of memory access instructions.

The instruction decoders 228 and 229 can specify a relative order for issuing and executing load and store instructions within a block. For example, a numerical load/store identifier (LSID) can be assigned to each memory access instruction, or to only the memory store instructions. A higher-numbered LSID indicates that the instruction should execute after a lower-numbered LSID. In some examples, the processor can determine that two load/store instructions do not conflict (e.g., based on the read/write address for the instruction) and can execute the instructions in a different order, although the resulting state of the machine should not be different than as if the instructions had executed in the designated LSID ordering. In some examples, load/store instructions having mutually exclusive predicate values can use the same LSID value. For example, if a first load/store instruction is predicated on a value p being true, and second load/store instruction is predicated on a value p being false, then each instruction can have the same LSID value.

The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211. Further, each of the decoders 228 and 229 can send data to the control unit 205, for example, to configure operation of the processor core 111 according to execution flags specified in an instruction block header or in an instruction. Each of the instruction decoders 228 and 229 are configured to generate identifiers indicating a relative ordering for one or more memory access instructions in an instruction block. These identifiers can be used to determine that all memory access instructions to be executed for the instruction block have executed. For example, the instruction decoders can analyze the instructions (e.g., by constructing a control flow graph or equivalent) to determine predicates associated with memory access instructions in the block. Based on the predicates, it is determined that certain memory access instructions must execute before other memory access or jump instructions in order to allow proper instruction block implementation.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate buffer 244, three broadcast channels 245, and an instruction scoreboard 247. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands and predicates are read from the operand buffers 242 and 243 and predicate buffer 244, respectively, not the register file. The instruction scoreboard 245 can include a buffer for predicates directed to an instruction, including wire-OR logic for combining predicates sent to an instruction by multiple instructions.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand(s) using the scoreboard 245. The control unit 205 further monitors data indicating a relative ordering of memory access instructions (e.g., using load/store identifiers generated by the instruction decoder) and data indicating which instructions have executed (e.g., by tracking each instruction and/or maintaining a count of a number of memory store instructions that have issued). When all of the input operands and predicate(s) for a particular decoded instruction are ready, and any previously-ordered memory access instructions (e.g., previously ordered memory store instructions) have issued and/or executed, the instruction is ready to issue. The control unit 205 then initiates execution of (issues) one or more next instruction(s) (e.g., the lowest numbered ready instruction) each cycle, and control signals based on the decoded instruction and the instruction's input operands are sent to one or more of functional units 260 for execution. The decoded instruction can also encodes a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and ready instructions can be scheduled in a first-in first-out (FIFO) order from the ready queue. For instructions associated with generated load store identifiers (LSIDs), the execution order will also follow the priorities enumerated in the generated instruction LSIDs, or by executed in an order that appears as if the instructions were executed in the specified order.

Information stored in the scoreboard 245 can include, but is not limited to, the associated instruction's execution predicate(s) (such as whether the instruction is waiting for a predicate bit to be calculated and whether the instruction executes if the predicate bit is true or false), availability of operands to the instruction, or other prerequisites required before issuing and executing the associated individual instruction. The number of instructions that are stored in each instruction window generally corresponds to the number of instructions within an instruction block. In some examples, operands and/or predicates are received on one or more broadcast channels that allow sending the same operand or predicate to a larger number of instructions. In some examples, the number of instructions within an instruction block can be 32, 64, 128, 1,024, or another number of instructions. In some examples of the disclosed technology, an instruction block is allocated across multiple instruction windows within a processor core. Out-of-order operation and memory access can be controlled according to data specifying one or more modes of operation.

In some examples, restrictions are imposed on the processor (e.g., according to an architectural definition, or by a programmable configuration of the processor) to disable execution of instructions out of the sequential order in which the instructions are arranged in an instruction block. In some examples, the lowest-numbered instruction available is configured to be the next instruction to execute. In some examples, control logic traverses the instructions in the instruction block and executes the next instruction that is ready to execute. In some examples, only one instruction can issue and/or execute at a time. In some examples, the instructions within an instruction block issue and execute in a deterministic order (e.g., the sequential order in which the instructions are arranged in the block). In some examples, the restrictions on instruction ordering can be configured when using a software debugger to by a user debugging a program executing on a block-based processor.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include a load/store queue 275, which can be used to issue memory instructions, a data cache 277, which stores data being input to or output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block). In some examples, data indicating relative ordering and execution status is used to determine whether the instruction block can be committed.

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor 100.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
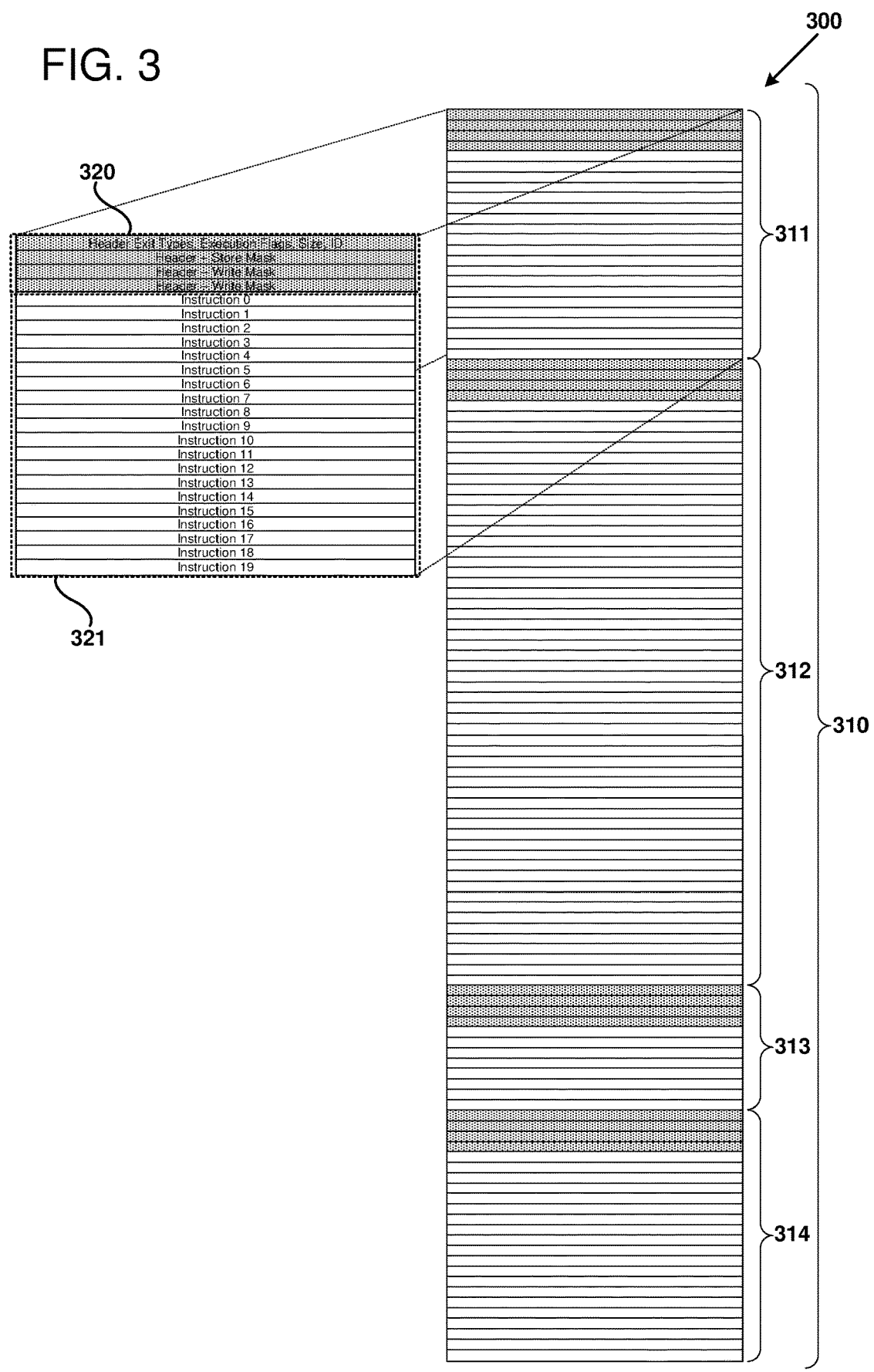
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include one or more execution flags that indicate one or more modes of operation for executing the instruction block. For example, the modes of operation can include core fusion operation, vector mode operation, memory dependence prediction, and/or in-order or deterministic instruction execution.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a store mask that indicates which of the load-store queue identifiers encoded in the block instructions are assigned to store operations. The instruction block header can also include a write mask, which identifies which global register(s) the associated instruction block will write. In some examples, the store mask is stored in a store vector register by, for example, an instruction decoder (e.g., decoder 228 or 229). In other examples, the instruction block header 320 does not include the store mask, but the store mask is generated dynamically by the instruction decoder by analyzing instruction dependencies when the instruction block is decoded. For example, the decoder can generate load store identifiers for instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The the write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative execution based on control flow and data regarding memory access instructions stored in a hardware structure, such as a store instruction data store 207. In some examples, the store instruction data store 207 is not architecturally visible. In some examples, access to the store instruction data store 207 is configured to be limited to processor operation in a supervisory mode or other protected mode of the processor.

VI. Example Block Instruction Target Encoding

Figure 4:
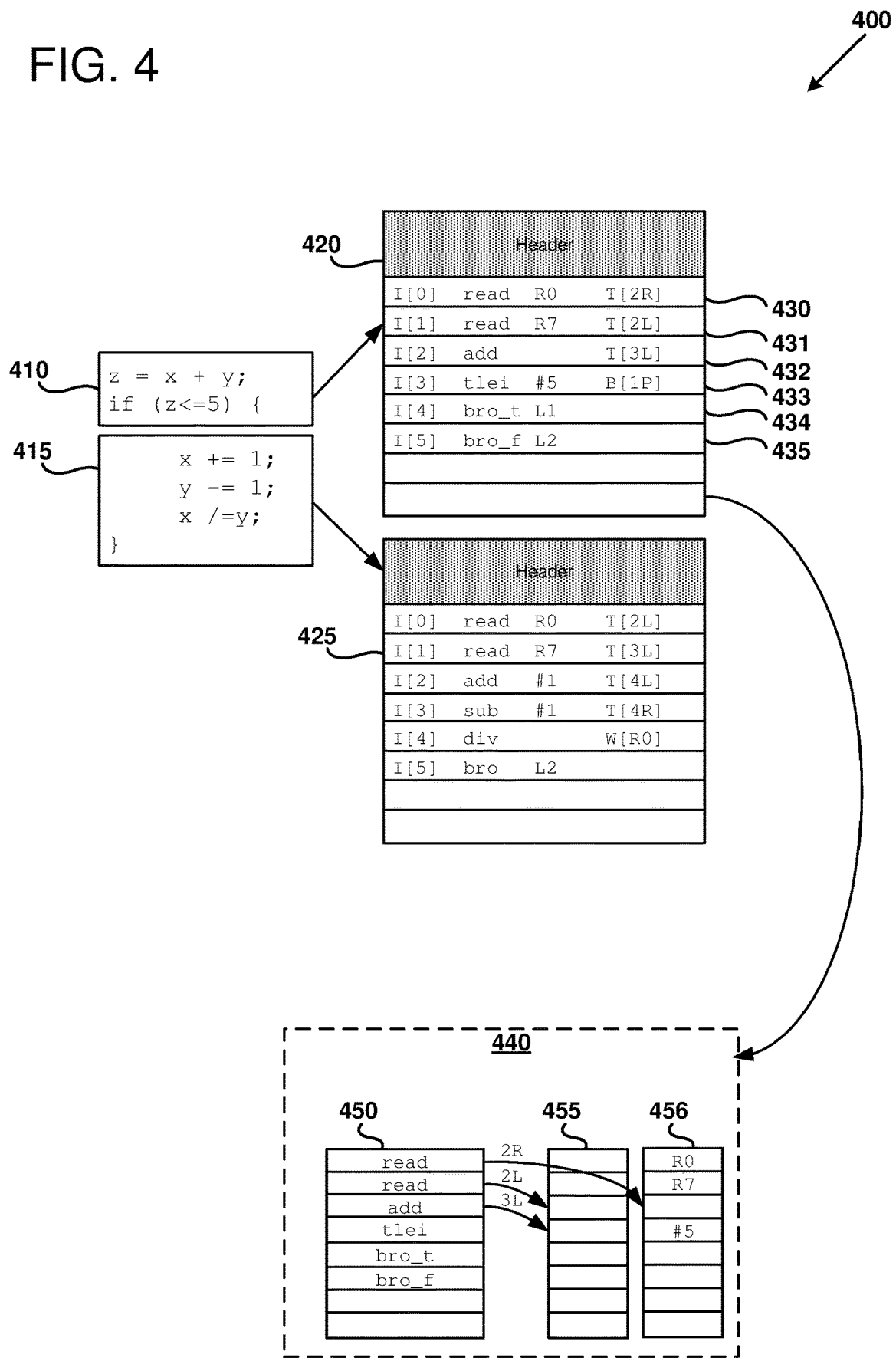
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432 (2R indicates targeting the right operand of instruction number 2; 2L indicates the left operand of instruction number 2). In the illustrated ISA, the read instruction is the only instruction that reads from the global register file (e.g., register file 230); however any instruction can target, the global register file. When the ADD instruction 432 receives the result of both register reads it will become ready and execute. It is noted that the present disclosure sometimes refers to the right operand as OP0 and the left operand as OP1.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will fire (execute), but the other instruction, encoded with the complementary predicated, will not fire/execute.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a number of exit type fields, a number of execution flag fields, an instruction block size field, and an instruction header ID bit (the least significant bit of the instruction header). In some examples, the instruction header 510 includes metadata 515 and/or 516, which can be used to store additional information used to indicate target operands. In some examples, a number of target operands are encoded in the instruction header 510 and associated with an identifier (e.g., an instruction identifier based on the position of the instruction generating a result used to generate the target operands for a variable number of target instructions). In such embodiments, the use of variable-length instructions can be avoided by encoding such target operand and instruction information in the header and referring to the header. In some examples, the metadata refers the associated source instruction.

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specify the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory).

VIII. Example Processor State Diagram

Figure 6:
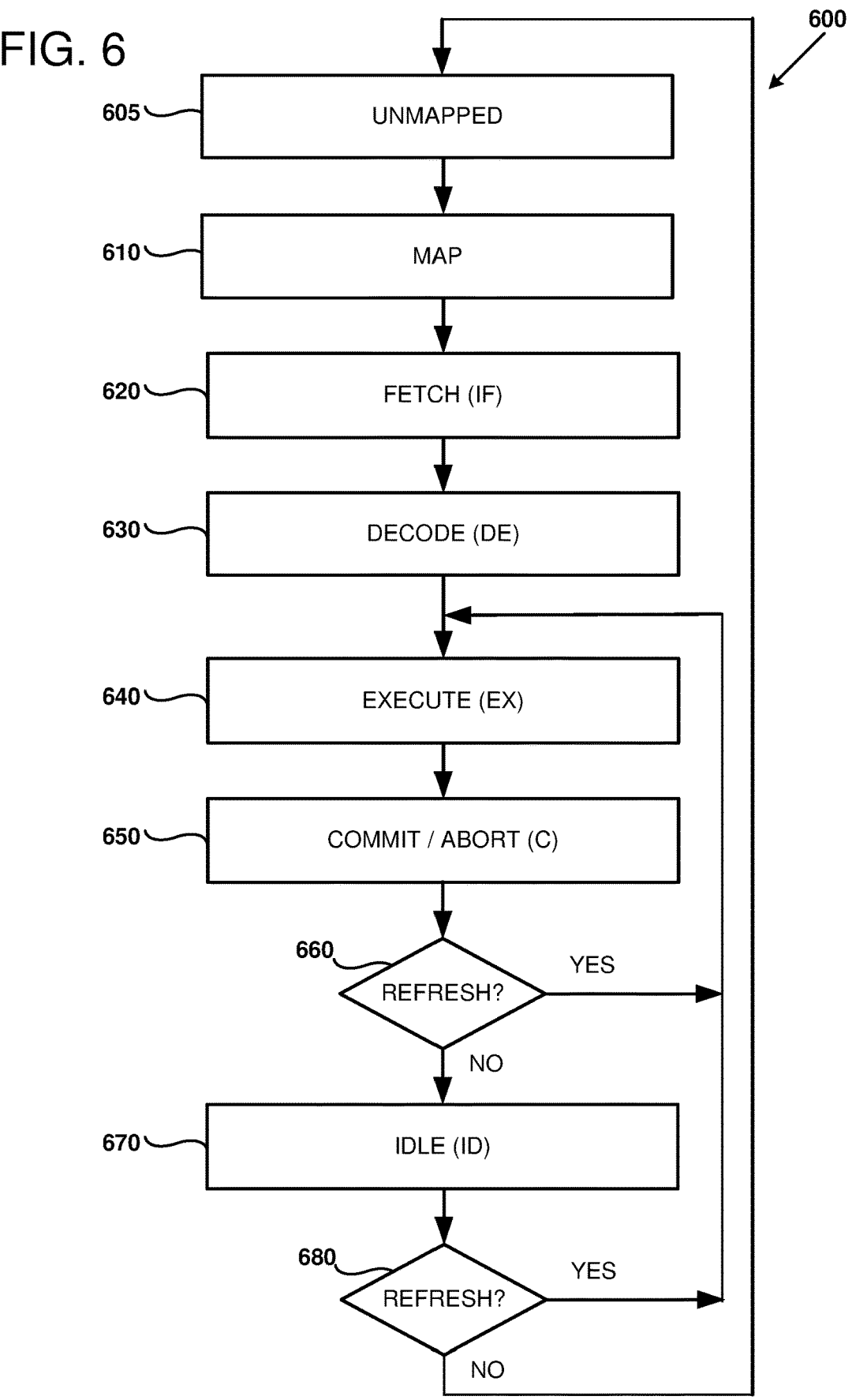
FIG. 6 is a state diagram illustrating a number of states assigned to an instruction block as it is mapped, executed, and retired.

FIG. 6 is a state diagram 600 illustrating number of states assigned to an instruction block as it is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped.

The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 620.

When the instruction block is in the fetch state 620 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction, including generation of identifiers indicating relative ordering of memory access instructions. For example, the decoded instructions can be stored in one of the memory stores 215 or 216 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort 650. In some examples, the control logic uses a write mask and/or a store mask for an instruction block to determine whether execution has proceeded sufficiently to commit the instruction block.

At the commit/abort state 650, the processor core control unit determines that operations performed by the instruction block can be completed. For example memory load store operations, register read/writes, branch instructions, and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-committed execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines 680 whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Instruction Encodings for Variable Number of Target Operands

Figure 7:
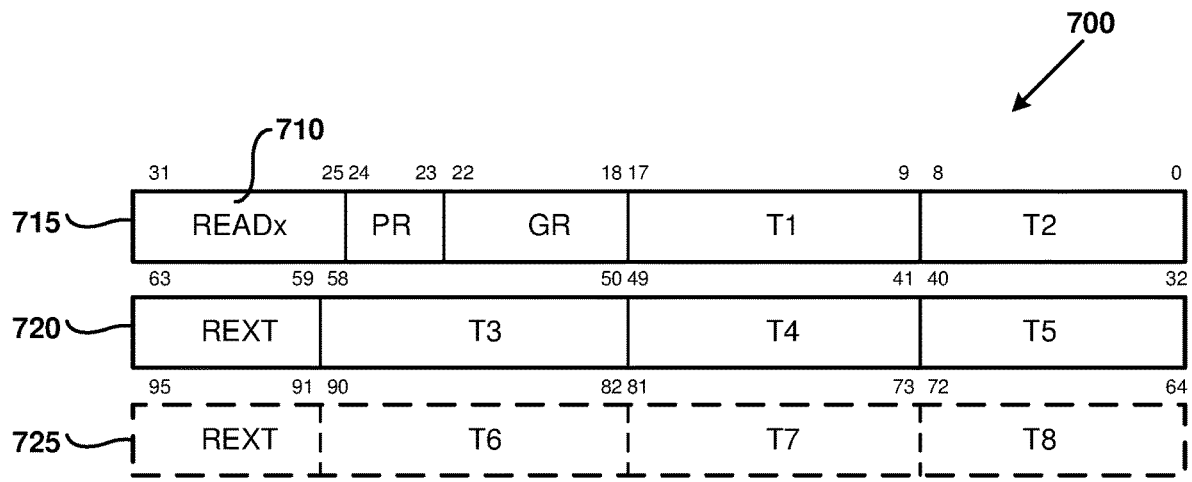
FIG. 7 illustrates an example of variable-length instruction, as can be used in some examples of the disclosed technology.

FIG. 7 is a diagram 700 illustrating a generalized example of a variable length instruction format that can be used for various block-based instructions for a block-based processor. In some examples, the instruction opcode 710 is the same as the opcode for a fixed-length version of the instruction, while in other examples a different opcode is used to signal that the instruction has variable length. The instruction as depicted has two target operand fields T1 and T2 that designate target operands for sending a result from performing an operation specified by the instruction. In the illustrated example, each target operand is encoded using a 9-bit format discussed further below with respect to FIG. 8, which includes an indication of the targeted instruction (or broadcast ID) and the target type (e.g., left, right, or predicate operand). The illustrated instruction in FIG. 7 is a register READ instruction and includes a predicate field (PR) to indicate whether execution of the instruction is predicated, a general register field (GR) to indicate a source operand register from which to read a value, along with the two target operands T1 and T2. Because the instruction is a variable length instruction, additional target operands can be specified in subsequent words (e.g., words 720 and 725) of instruction data following the word 715 containing the opcode 710. In examples where the variable-length instruction uses the same opcode as the fixed-length instruction, an extended opcode (REXT) encoded at the beginning of the next word indicates that instruction is variable length. This second word 720 includes three target operands: T3, T4, and T5. The variable-length instruction can be extended to include further target operands in a third word (725), as indicated: T6, T7, and T8. Thus, for results produced by an instruction that are used by more than two target instructions or other targets, a single instruction can be used to generate the target operands. This can be especially beneficial with block-based processor architectures, where each instruction block executes as a single transaction, and changes to register values are not visible between different instructions executing in a single instance of execution of the instruction block. Thus, the issue of having the need for more than two target operands is not present in traditional RISC and CISC architectures.

Figure 8:
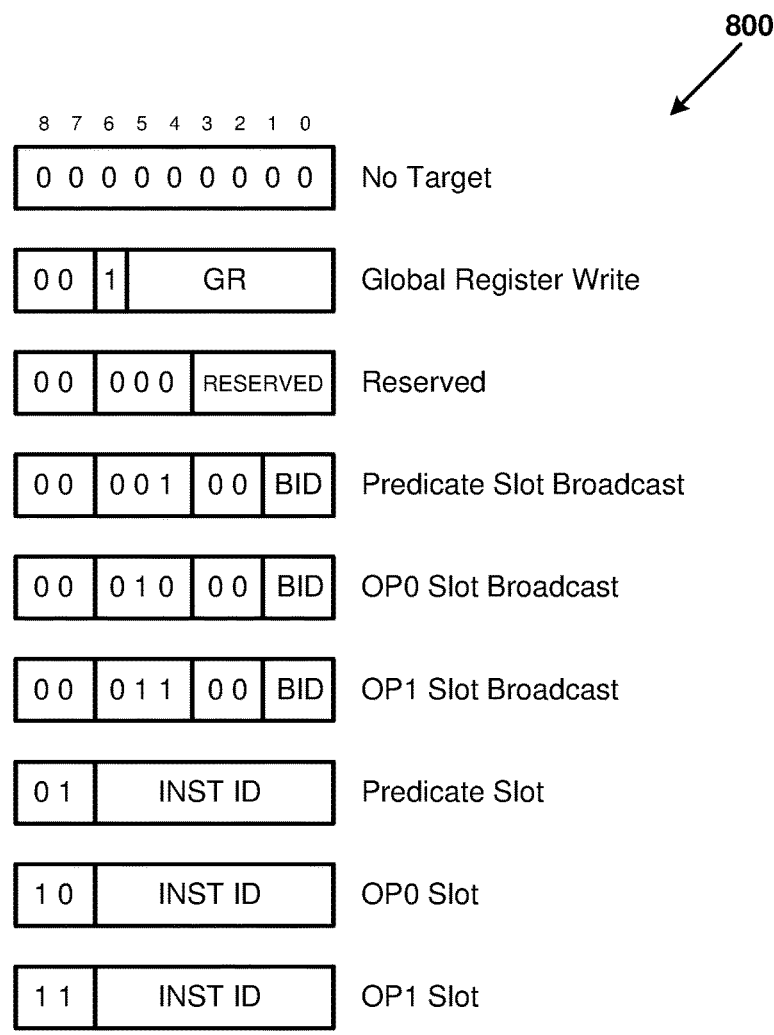
FIG. 8 illustrates an example target operand format, as can be used in certain examples of the disclosed technology.

FIG. 8 is a diagram 800 depicting an example format for encoding target operands, as can be used in certain examples of the disclosed technology. As shown, bits 7 and 8 of the target format are used to encode the general type of the target, which can be a general register write (to a global register file), a broadcast channel (that can be read by any number of instructions in an instruction block), a predicate slot for a specific instruction, specified by the INST ID field, or a left or right operand slot, also known as OP0 and OP1, respectively, for a specific instruction specified by the INST ID field. Thus, a single instruction can be encoded to target more than one type of target operand: a global register, an instruction data operand via a broadcast or instruction identifier, or an instruction predicate via a broadcast or instruction identifier. The variable length instruction format depicted in FIG. 7 could, for example, be encoded to target a general register with target operands T1 and T2, a broadcast channel with target operand T3, and specific instructions (predicate, left operand, or right operand) for target operands T4 and T5.

FIG. 9 is a diagram illustrating another example of a variable-length instruction format 900 as can be used in certain examples of the disclosed technology. As shown, the instruction includes an opcode 910, which can be the same opcode used for fixed-length versions of the same instruction, or can be a different opcode, depending on the particular processor architecture being employed. Similar to the variable length instruction of FIG. 7, the instruction includes a predicate field and a general register field. The next field, NLOP, indicates the number of left target operands to which data will be sent from the instruction: LOP1, LOP2, and LOP3. Each of the operands is encoded using 7 bits to indicate an instruction identifier, but does not include extra bits to indicate the field type, as this is based on the NLOP field of the instruction. Similarly, the instruction is also targeting two right operands, which will be encoded as an integer value 2 for the field NROP, followed by instruction identifiers to which to send the target operands ROP1 and ROP2. Finally, the instruction includes an NPRED field, which indicates the number of predicates target operands that are written to by the instruction. In this example, the number of predicate target operands is 4. Further, as shown, because the number of bits does not align perfectly with the 32 bit word size, some bits are left unused at the end of the second and third word of the instruction.

FIG. 9 also illustrates another example of a variable-length instruction format 950, as can be used in certain examples of the disclosed technology. In the variable-length instruction example of 950, the opcode 960 is for an add immediate instruction (ADDI), instead of a register read instruction. Thus, it is evident that the disclosed variable-length instruction formats are not limited to register reads, but can include other suitable instructions. In the illustrated instruction format 950, the instruction encodes three left operands: LOP1, LOP2, and LOP3, but does not include any right target operands or predicate target operands, and so the NROP and NPRED fields are set to zero.

Figure 10:
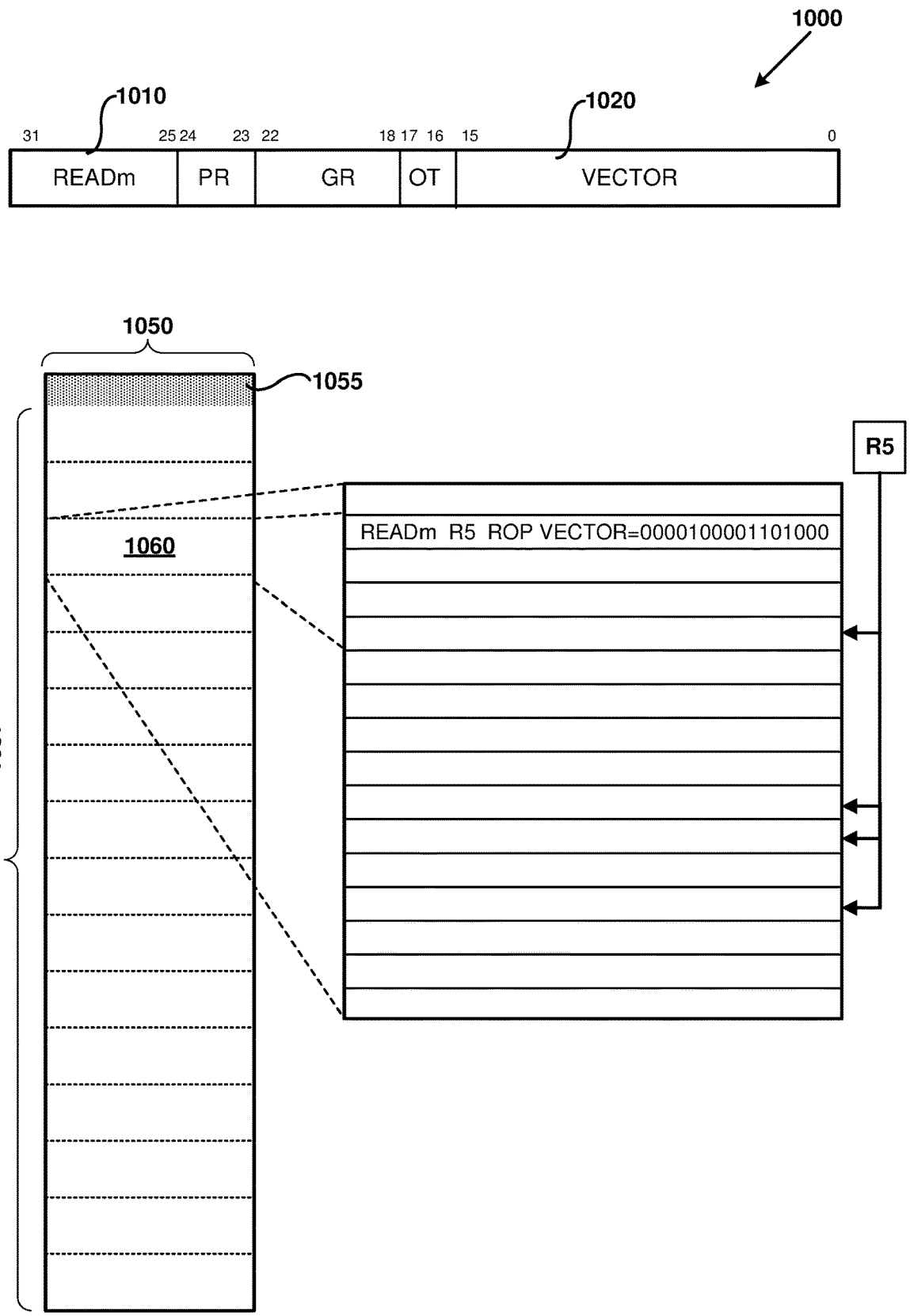
FIG. 10 illustrates an example target vector instruction, as can be used in certain examples of the disclosed technology.

FIG. 10 illustrates an example instruction format 1000 that can send instruction data to a plurality of target instructions using a vector format. The instruction includes an opcode 1010 that can be the same opcode as a corresponding fixed-length instruction, or in other examples, is a different opcode. The instruction also includes an operand type field at bits 17 and 16 (OT), which indicates the type of the target operand(s) that the instruction will send data. In the illustrated example, the OT field is encoded to indicate a right operand. Other instructions can be encoded with the OT field indicating a predicate, left operand, or other suitable target operand type. The instruction also includes a vector field 1020 that includes 16 bits, each bit being associated with a target instruction to which to send the target operand data. FIG. 10 also illustrates an example instruction block 1050 which includes an instruction header 1055 and 128 instructions 1057 that are grouped into 16-bit chunks, as indicated by the dashed lines. The example instruction is included in the second word of the third 16-bit chunk 1060. The illustrated instruction is a register read instruction from register number 5 and the OT field is set to ROP. Thus, the value of register 5 will be read from the register file and sent to each instruction indicated by the vector. In the illustrated example, the vector is 0000100001101000. Thus, the value of register 5 will be sent to instruction number 4, instruction number 9, instruction number 10, and instruction number 12. Thus, more than two instructions can be targeted by a single instruction using the illustrated instruction format. The instruction is limited, however, in that only instructions within the chunk can be targeted by the variable length target instruction (e.g., only instructions with the third instruction chunk 1060 that contains the instruction with a target operand vector).

In alternative examples, the vector format instruction is re-coded such that the 16-bits used for the vector can be combined with the bits used in the OT field. In such cases, the instruction block would be arranged in 6-bit chunks, and up to 6 instructions of each type (predicate, left operand, right operand) can receive data from a single vector instruction. In some examples, instructions are arranged such that the predicate target instructions are offset a fixed amount from the vector target instruction, the right operand target instructions are offset an additional 6 instructions, and the left operand target instructions are offset an additional 6 instructions, allowing the vector format to send results to a larger number of target instructions.

Figure 11:
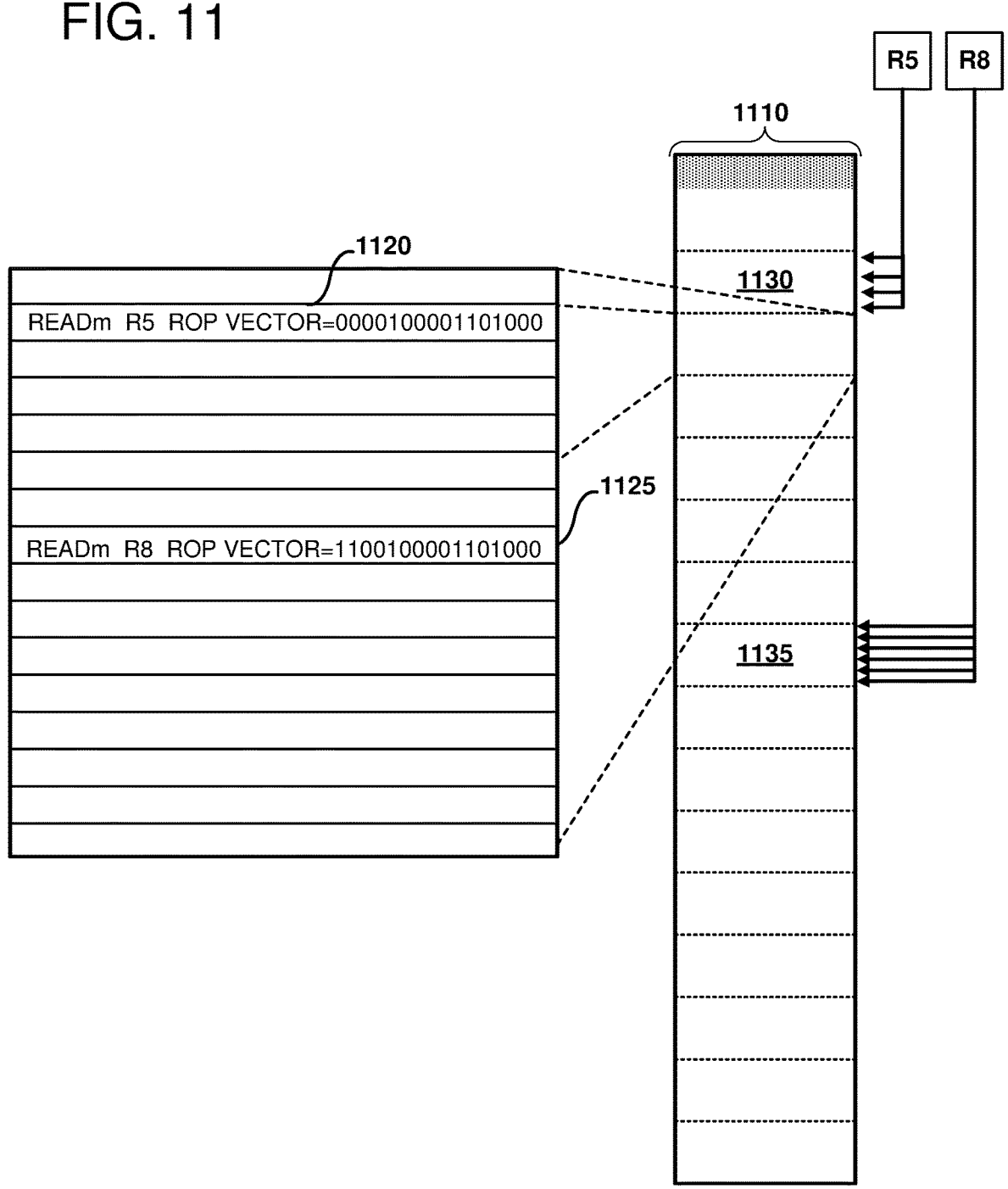
FIG. 11 illustrates an example target vector instruction, as can be used in certain examples of the disclosed technology.

FIG. 11 illustrates an alternative implementation of a target vector instruction, as can be implemented in certain examples of the disclosed technology. In the illustrated example, the relative position of an instruction within a 16-bit instruction chunk of an instruction block 1110 determines which chunk the instruction vector will send its target operands. Thus, a first instruction 1120 is located in the second word of the third chunk 1130 of the instruction block 1110. Thus, the four instructions associated with the instruction vector will be sent to instructions located within the second chunk. Similarly, the eighth instruction 1125 is also a targeted vector instruction, and because it is located at the eighth word, all of the values produced by the read instruction (here a read of register 8) will be sent to various instructions indicated by the vector within the eighth chunk 1135 of the instructions of the instruction block. Thus, instructions can be targeted based at least in part on the position of an instruction within an instruction chunk of an instruction block.

X. Example Block-Based Processor and Memory Configuration

Figure 12:
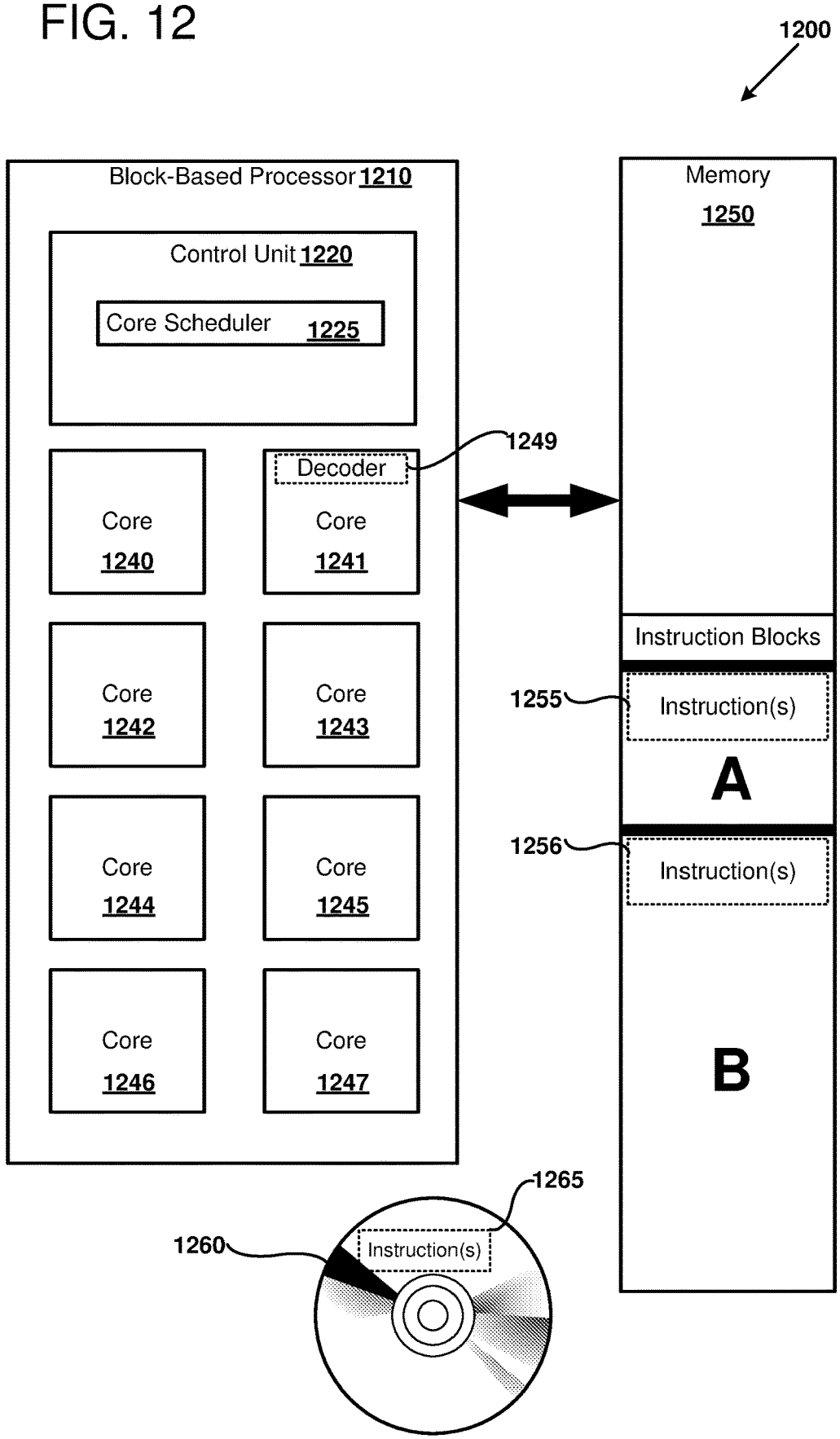
FIG. 12 illustrates a block-based processor configuration, as can be used in certain examples of the disclosed technology.

FIG. 12 is a diagram 1200 illustrating an apparatus comprising a block-based processor 1210, including a control unit 1220 configured to execute instruction blocks including instructions with a variable number of target operands. The control unit 1220 includes a core scheduler. The core scheduler 1225 schedules the flow of instruction blocks including allocation and de-allocation of cores for performing instruction processing, control of input data and output data between any of the cores, register files, memory interfaces and/or I/O interfaces.

The block-based processor 1210 also includes one or more processor cores 1240-747 configured to fetch and execute instruction blocks. Each of the cores includes an instruction decoder (e.g., decoder 1249) that decodes instruction opcodes, extended opcodes, and other fields to determine whether an instruction specifies a variable number and/or type of target operands. The illustrated block-based processor 1210 has up to eight cores, but in other examples there could be 64, 512, 1024, or other numbers of block-based processor cores. The block-based processor 1210 is coupled to a memory 1250 which includes a number of instruction blocks, including instruction blocks A and B, which include instructions (1255 and 1256) having a variable number of target operands, and to a computer-readable storage media disc 1260 that stores instructions 1265 having a variable number of target operands.

Figure 13:
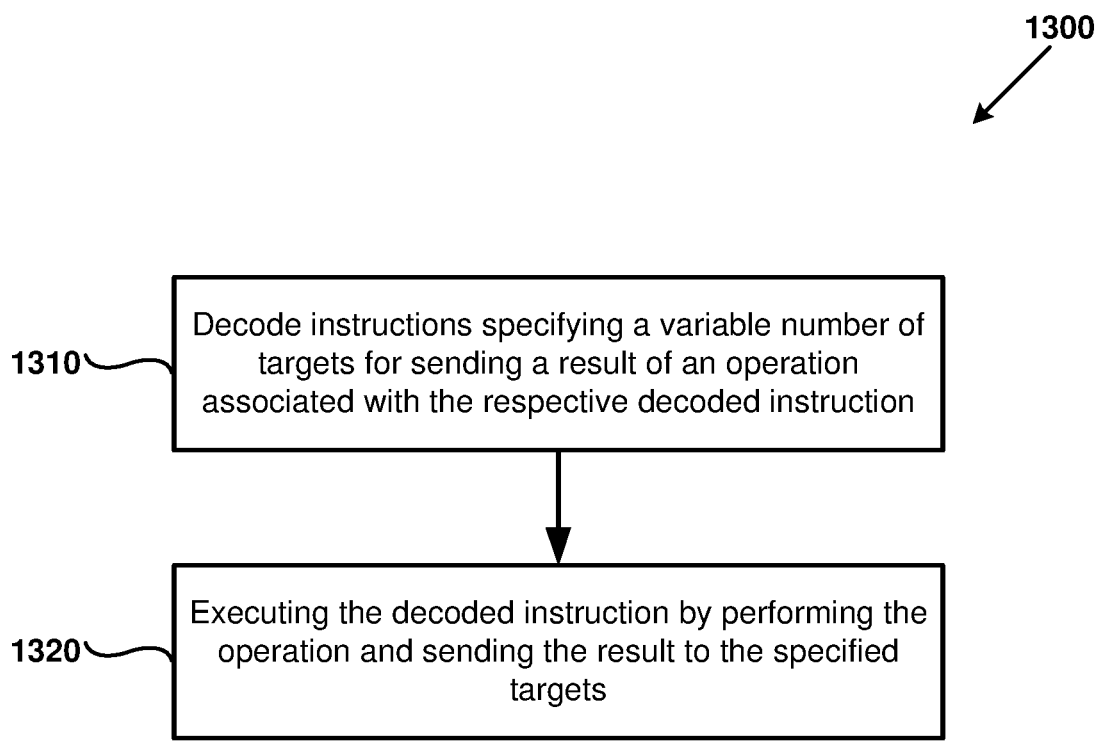
FIG. 13 is a flowchart outlining an example method of decoding and executing an instruction specifying a variable number of target operands, as can be performed in certain examples of the disclosed technology.

XI. Example Method of Decoding and Executing Instructions with Variable Target Operands FIG. 13 is a flowchart 1300 outlining an example method of decoding and executing instructions having variable numbers of target operands, as can be performed in certain examples of the disclosed technology. For example, a block-based processor 100 of FIG. 1, including the block-based processor core 111, described above in FIG. 2 can be used to perform the outlining method. In some examples, an instruction decoder of a block-based processor is configured to decode instructions having variable numbers of target operands and execute the decoded instruction, including sending data to the specified target operands to the specified target instructions.

At process block 1310, one or more instructions from a block-based processor instruction block are decoded. At least one of the decoded instructions specifies two or more targets for sending the result of an operation associated with the respective instruction. The same instruction format can be used to specify one, two, three, or more targets, depending on the particular instruction format employed.

At process block 1320, the decoded instruction is executed by performing the operation specified by the instruction opcode and by sending the result to the specified targets that were decoded at process block 1310. In some examples, the variable number of target operands can be specified by using a designated opcode, a field specifying the number of and/or type of target operands, followed by a number of designators indicating the target instruction. In other examples, a target instruction is encoded with multiple target operands using a target vector which includes a bit designating each instruction to send the result of the operation performed by the instruction. In some examples, a target instruction to which to send the target operand is identified based at least in part on the relative location of the decoded instruction within the instruction block. In some examples, the instruction encodes multiple target operands, but the multiple target operands are all for the same type, for example, predicate, left operand, or right operand. In other examples, the specified target operand can be for multiple types. In some examples, the instruction having multiple targets is a register read instruction, while in other examples, the processor allows any operation that produces a value to have a variable number of target operands. In some examples, a control unit (e.g., the control unit 205) includes a hardware structure that can buffer one or more of the target operands for a consecutive number of clock cycles. In some examples, each instruction includes a buffer that can store its respective left, right, and predicate operands until the instruction issues and executes. In other examples, a buffer in the hardware structure of the control unit stores the target operand until one or more receiving target instructions are ready to issue and execute.

XII. Example Source and Object Code

FIGS. 14A-B illustrate an example of source code 1410 and corresponding assembly code 1420 and 1430 for a block-based processor, as can be used in certain examples of the disclosed technology. The source code 1410 includes an if/else statement. Statements within each portion of the if/else statement include a number of memory reads and memory writes to arrays a[ ] and b[ ]. When the source code 1410 is transformed to assembly code (and subsequently, machine code stored as object code), a number of load and store assembly instructions will be generated.

The assembly code 1420 for the source code portion 1410 includes 28 instructions numbered 0 through 27. The assembly instructions do not include variable target operands, so no instruction can target more than two target instructions. In some cases, broadcast channels are used (e.g., B1R and B2P) to send values to more than one or two target instructions. The assembly code indicates a number of fields, for example an instruction opcode pneumonic, a source data specified by the instruction, for example, broadcast identifiers or immediate arguments, and target designations. The assembly code includes register read instructions (0-3), arithmetic instructions (e.g., instructions 3 and 4), and move instructions for sending data to multiple targets (e.g., move instructions 5 and 6). The assembly code 1420 also includes a test instruction 11, which is a test if greater than instruction that will generate a predicate value on broadcast channel 2 (B2P). Further, the assembly code includes two unpredicated memory load instructions 7 and 8, and predicated memory load instructions 16 and 23. The assembly code 1420 also includes a number of memory store instructions, which will store data to a memory address, for example, predicated store instructions 12, 13, 18, and 26.

In addition to the use of broadcast channels, the assembly code also copies values using the MOV instruction. For example, LD instruction 7, performs a memory read from address a[i] and sends the value to MOV instruction 8. The value is then copied to instructions 13, left operand and to instruction 11, left operand. This extra MOV instruction is used because the 32-bit fixed length instruction format only allows for one target operand for the LD instruction.

Turning to FIG. 14B, the assembly code portion 1430 for the source code portion 1410 has been re-coded to use variable length target operand formats. This reduces the total number of instructions by 7 instructions, and only uses an additional two words of instruction code for the extended target portion. The instruction IDs have not been changed to facilitate comparison to assembly code portion 1420, but the instructions could be compacted to take less space. For example, instruction 2 has been replaced by the READY instruction, which encodes two left operand targets (instruction ID 15L and 22L) and two right operand targets (instruction ID 19R and 24R). The instruction format discussed above regarding FIG. 9 can be used to encode these two different target operand types using a single instruction and one additional word of instruction data. In other examples, the READX instruction discussed in FIG. 8 could be used to encode instruction 2. The associated MOV instructions 14 and 21 shown in assembly code portion 1420, have also been eliminated.

Instructions 3 and 11 have been encoded using the vector format discussed above regarding FIG. 10. It should be noted that all of the operands are of the same type, which will be specified in the encoded OT field for the instruction. This can save a number of instructions, for example, instruction 11 is encoded in a vector format with seven target instructions. The re-coded assembly code portion 1430 also eliminates the use of broadcast channels. In some examples, the processor core can be optimized by eliminating the use of broadcast channels and using variable target operand instructions and associated hardware. Further, the use of broadcast id bits can be allocated to other functionalities, or to extend bits used in other instruction fields (e.g., for encoding immediate values).

The assembly code portions 1420 and 1430 can be converted to machine code for actual execution by a block-based processor. For example, assembly code can be encoded using fixed length instruction formats similar to those discussed above regarding FIG. 5, and variable operand instruction formats discussed above regarding FIGS. 7-11, depending on the particular machine architecture and compiler parameters. In some examples, some instruction formats can be selected based on performance vs. code density targets.

XIII. Example Method of Transforming Code

Figure 15:
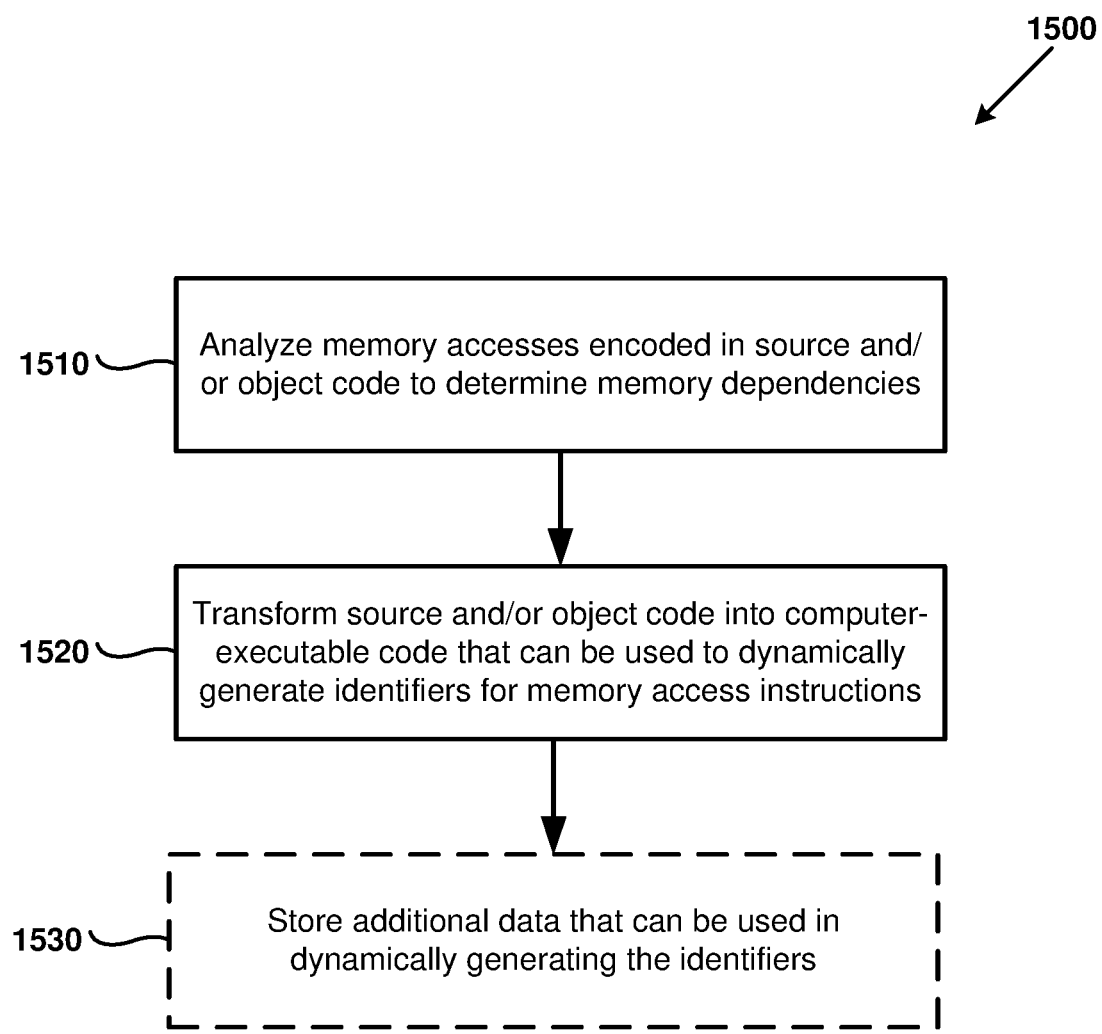
FIG. 15 is a flowchart outlining an example method of transforming source and/or object code into computer-executable code for a block-based processor, as can be performed in certain examples of the disclosed technology.

FIG. 15 is a flowchart 1500 outlining an example method of generating computer-executable code for a block-based processor, as can be performed in certain examples of the disclosed technology. For example, the block-based processor 100 of FIG. 1, including the block-based processor core 111, described above in FIG. 2, can be used to perform the outlined method. In other examples, a general-purpose RISC or CISC processor is used to generate instructions that will be executed by a block-based processor. In some examples, the code is transformed by a compiler and stored as object code that can be executed by a block-based processor. In some examples, a just-in-time compiler or an interpreter generates computer-executable code at run time.

At process block 1510, source code and/or object code is analyzed to determine operand dependencies for an instruction block to be admitted by a compiler or interpreter. For example, a compiler can analyze to determine that the same target operand is going to be sent to multiple different instructions. In some examples, parameters such as code size, execution speed, broadcast channel availability, instruction address space, and other suitable parameters are analyzed in conjunction with the source code to determine the operand dependencies. After analyzing the operand dependencies, the method proceeds to process block 1520.

At process block 1520, the source code and/or object code analyzed at process block 1510 is transformed into computer-executable code for one or more instruction blocks, the computer-executable code includes instructions that encode target operands according to a variable-length format. In some examples, the instruction format encodes a variable number of target operands by specifying an instruction identifier for each target operand, similar to the format discussed above regarding FIG. 7. In other examples, the variable-length target operands are specified using a vector similar to that discussed above regarding FIGS. 10 and 11.

Once the code has been transformed into block-based processor code, it can be stored in a computer-readable storage medium, or transmitted via a computer network to another location for execution by a block-based processor.

In some examples of the method, the compiler assigns priorities to target operands targeted by a single variable-length instruction having a variable number of target operands. The compiler can then arrange the order of the target operands such that higher priority target operands will be set to their target instructions before lower priority target operands. For example, if certain target instructions have different latency or other execution requirements, their target operands can be ordered accordingly in order to improve execution of the instruction block overall. In some examples, the compiler re-orders extending instruction and/or a target instruction such that all target instructions for an instruction sending plural target operands will be located within a portion of the instruction block that can be addressed by descending instruction. In some examples of the method, the method further includes determining a location for the instruction within an instruction block of the transformed code that will cause a processor executing the instruction to send variable numbers of target operands to a truck of instruction based at least in part on the location of the sending instruction.

Once the code has been transformed into block-based processor code, it can be stored in a computer readable storage medium, or transmitted via a computer network to another location for execution by a block-based processor.

XIV. Exemplary Computing Environment

Figure 16:
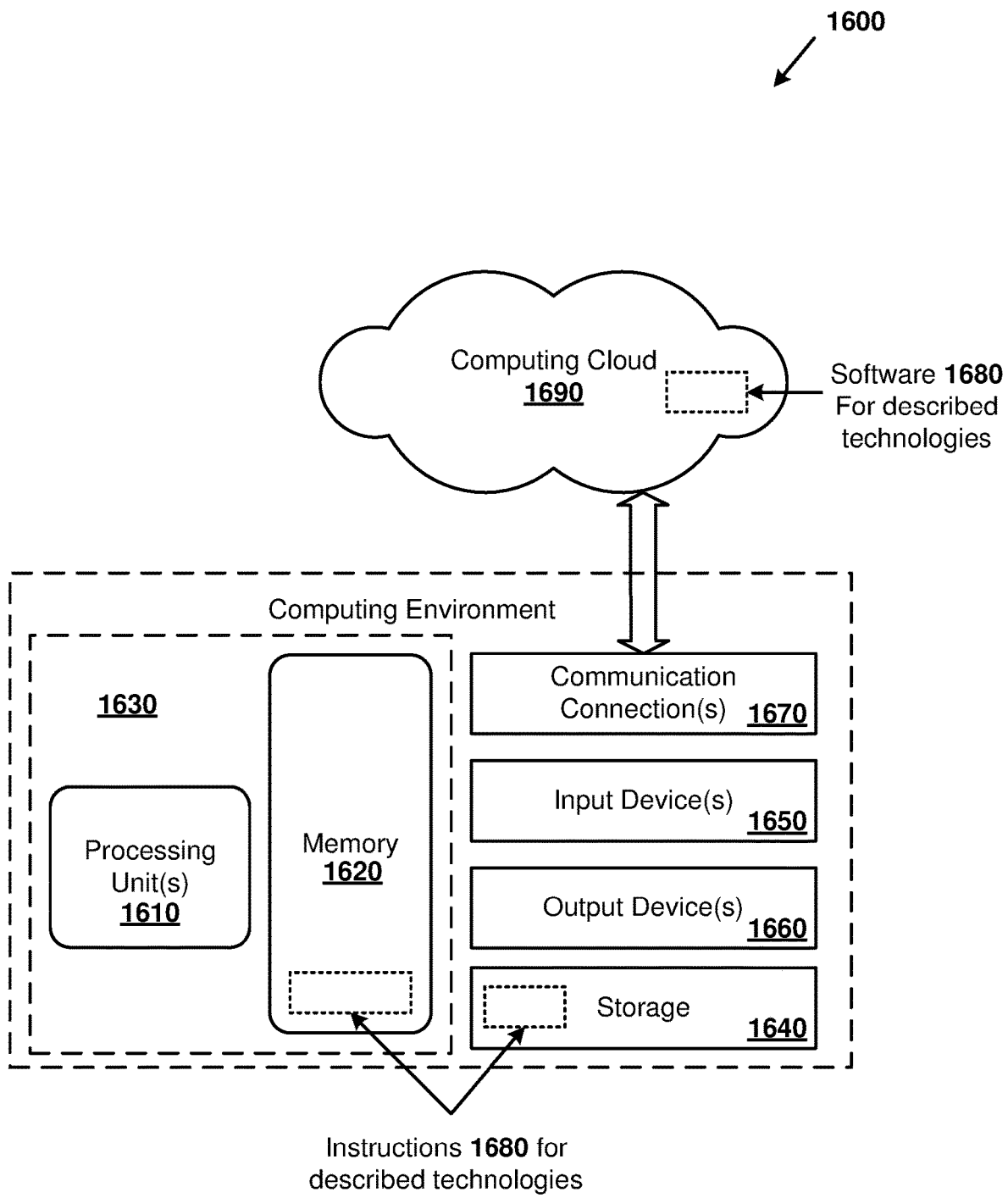
FIG. 16 is a block diagram illustrating a suitable computing environment for implementing some embodiments of the disclosed technology.

FIG. 16 illustrates a generalized example of a suitable computing environment 1600 in which described embodiments, techniques, and technologies, including configuring a block-based processor, can be implemented. For example, the computing environment 1600 can implement disclosed techniques for configuring a processor to generate relative ordering data for one or more instruction blocks, or compile code into computer-executable instructions for performing such operations, as described herein.

The computing environment 1600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 16, the computing environment 1600 includes at least one block-based processing unit 1610 and memory 1620. In FIG. 16, this most basic configuration 1630 is included within a dashed line. The block-based processing unit 1610 executes computer-executable instructions and may be a real or a virtual processor. In a multi-processing system, multiple processing units execute computer-executable instructions to increase processing power and as such, multiple processors can be running simultaneously. The memory 1620 may be volatile memory (e.g., registers, cache, RAM), non-volatile memory (e.g., ROM, EEPROM, flash memory, etc.), or some combination of the two. The memory 1620 stores software 1680, images, and video that can, for example, implement the technologies described herein. A computing environment may have additional features. For example, the computing environment 1600 includes storage 1640, one or more input device(s) 1650, one or more output device(s) 1660, and one or more communication connection(s) 1670. An interconnection mechanism (not shown) such as a bus, a controller, or a network, interconnects the components of the computing environment 1600. Typically, operating system software (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, or any other medium which can be used to store information and that can be accessed within the computing environment 1600. The storage 1640 stores instructions for the software 1680, plugin data, and messages, which can be used to implement technologies described herein.

The input device(s) 1650 may be a touch input device, such as a keyboard, keypad, mouse, touch screen display, pen, or trackball, a voice input device, a scanning device, or another device, that provides input to the computing environment 1600. For audio, the input device(s) 1650 may be a sound card or similar device that accepts audio input in analog or digital form, or a CD-ROM reader that provides audio samples to the computing environment 1600. The output device(s) 1660 may be a display, printer, speaker, CD-writer, or another device that provides output from the computing environment 1600.

The communication connection(s) 1670 enable communication over a communication medium (e.g., a connecting network) to another computing entity. The communication medium conveys information such as computer-executable instructions, compressed graphics information, video, or other data in a modulated data signal. The communication connection(s) 1670 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1690. For example, disclosed compilers and/or block-based-processor servers are located in the computing environment, or the disclosed compilers can be executed on servers located in the computing cloud 1690. In some examples, the disclosed compilers execute on traditional central processing units (e.g., RISC or CISC processors).

Computer-readable media are any available media that can be accessed within a computing environment 1600. By way of example, and not limitation, with the computing environment 1600, computer-readable media include memory 1620 and/or storage 1640. As should be readily understood, the term computer-readable storage media includes the media for data storage such as memory 1620 and storage 1640, and not transmission media such as modulated data signals.

XV. Additional Examples of the Disclosed Technology

Additional examples of the disclosed subject matter are discussed herein in accordance with the examples discussed above. The additional examples can be further understood by one of ordinary skill in the relevant art with reference to Appendix A, which follows In some examples of the disclosed technology, an apparatus includes memory and one or more block-based processor cores. One or more of the processor cores includes an instruction decoder configured to decode target operands for an instruction in an instruction block, the instruction being encoded to allow for a variable number of target operands and a control unit configured to send data for each of the decoded target operands for the operation specified by the targeted instructions.

In some examples, the processor cores include an execution unit configured to perform the operation using the at least one of the decoded operands. In some examples, the instruction is encoded with a variable number of instruction targets indicating the instruction identifiers for the target operands. In some examples, the instructions targets also indicate the type of each of the target operands. In other examples, the instruction is encoded with a bit vector indicating the instruction targets. In some examples, one or more types of the target operands can be one or more of the following: an identifier of another instruction within the instruction block, a global register, a broadcast channel, an identifier of another instruction block, and a memory address. In some examples, the field encoding the target operand supports one, more, or all of the types. In some examples, different instruction opcodes are used for different operand types. In some examples, at least one of the target operands indicates a predicate operand, a right operand, or a left operand for an operation performed by a target instruction.

In some examples, an instruction decoder is configured to determine a target instruction to receive target operand data based at least in part on a relative position of the instruction within the instruction block. In some examples, the instruction decoder is configured to decode the target operands based on an extended opcode encoded in a different word of the instruction block. In some examples, the instruction decoder is configured to decode the instruction as a fixed-length instruction or a variable number of target instruction based at least in part on an opcode for the instruction encoded in the instruction block.

In some examples of the disclosed technology, a method of operating a processor to execute an instruction block includes decoding one or more instructions from the instruction block, at least one of the decoded instructions specifying two or more targets for sending a result of an operation associated with the respective instruction and executing the decoded instruction by performing the operation and sending the result to the specified two or more targets.

In some examples, the decoding includes determining the specified two or more targets based at least in part on a relative location of the decoded instruction within the instruction block or a relative location of the decoded instruction within a portion of the instruction block. In some examples, both relative locations of the decoded instruction are used.

In some examples, the decoding includes determining the specified two or more targets based at least in part on a vector. In some examples, the decoding includes decoding data indicating a number of target operands having a particular type and determining target locations to send data for the target operands of the particular type.

In some examples, the decoding includes determining types of target instruction operands. Examples of suitable operand types include left operand, right operand, and predicate operand. In some examples, the target operands types can be specified in different fashions (e.g., as a number or letter), or include different types (e.g., different types for integer vs. fixed point values). In some examples, complex predicate operands, or no predicate operands, are specified. In some examples, the decoding includes determining types of target instruction operands, and the types can be any one or more of the following: target instruction, broadcast channel, register, and memory. In some examples, broadcast channel is not a supported type. In some examples, register is not a supported type. In some examples, memory is not a supported type. In some examples, target instruction is not a supported type. In some examples, target instruction is the only supported type, or is the only supported type for certain classes of opcodes.

In some examples, the instruction is a register read. In some examples, additional instructions can support a variable number of target instructions, for example, arithmetic, logic, and/or move instructions.

In some examples of the disclose technology, a method of compiling source and/or linking object code for a block-based processor includes analyzing source code and/or object code to determine operand dependencies for the instruction block, and transforming the source code and/or object code into computer-executable code for the instruction block, the computer-executable code including instructions that encode target operands according to a variable length format. In some examples, the method is performed by executing computer-readable instructions on a block-based processor. In other examples, the method is performed by executing computer-readable instructions on a general-purpose or application specific processor (e.g., a CISC or RISC CPU; or a GPU or other specialized co-processor, respectively).

In some examples, the compiling method includes assigning priorities to the target operands and arranging the target operands so that higher priority target operands will be sent to their target instructions before lower priority target operands. In some examples, the method includes reordering target instructions such that all the target instructions for one instruction sending plural target operands will be all located within a portion of the instruction block that can be addressed by the sending instruction.

In some examples, the method includes determining a location for the instruction within the instruction block of the transformed code that will cause a processor executing the instruction to send variable target operands to a chunk of instruction based at least in part on the location.

In some examples, computer-readable storage media store computer-readable instructions for an instruction block that when executed by a processor, cause the processor to perform any one or more of the disclosed methods.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising one or more processor cores, at least one of the cores comprising:
    instruction cache or main memory storing a variable-length format instruction encoded as a first word stored in the memory at a first memory location, the variable-length format instruction having an opcode field indicating the instruction's operation, an extended opcode field indicating a number of the instruction's target operand fields, and at least one target operand field encoded in a second word at a second, different location in the memory subsequent to the first word;
    an instruction decoder configured to fetch the first word from the first memory location, and decode the instruction's operation from the opcode field and the number of the instruction's target operand fields from the extended opcode field, and
        based on the number of the instruction's target operand fields indicated by the decoded extended opcode field, fetch and decode the at least one target operand field from the second, different location in the instruction cache or main memory subsequent to the first word; and
    a control unit configured to send result data from performing the operation indicated by the opcode field for each of the decoded target operands for an operation specified by at least one instruction receiving the data sent for each of the decoded target operands.

2. The apparatus of claim 1, further comprising an execution unit configured to perform the operation using the at least one of the decoded operands.

3. The apparatus of claim 1, wherein the instruction is encoded with a variable number of instruction targets indicating instruction identifiers for the target operands.

4. The apparatus of claim 1, wherein the instruction is encoded with a bit vector indicating the instruction targets.

5. The apparatus of claim 1, wherein one or more types of the target operands are selected from the group consisting of the following: an identifier of another instruction, a global register, a broadcast channel, and a memory address.

6. The apparatus of claim 1, wherein at least one of the target operands indicates a predicate operand, a right operand, or a left operand for an operation performed by a target instruction.

7. The apparatus of claim 1, wherein the decoder is configured to determine a target instruction to receive target operand data based at least in part on position of the instruction within the instruction cache or main memory.

8. The apparatus of claim 1, wherein the decoder is configured to decode the target operands based on an extended opcode encoded in a different word of the instruction cache or main memory.

9. The apparatus of claim 1, wherein the decoder is configured to decode the instruction as a fixed-length instruction or a variable number of target instruction based at least in part on an opcode for the instruction encoded in the instruction cache or main memory.

10. The apparatus of claim 1, wherein at least one of the target operand fields is a memory address.

11. A method comprising:
    fetching and decoding a native, first instruction stored at a first address in an instruction cache or main memory coupled to a processor, the first instruction being encoded in one word of the instruction cache or main memory, the one word of the instruction cache or main memory including an opcode field encoding an opcode specifying an operation performed by the instruction and at least one target operand field specifying a target for sending a result of performing the specified operation;

executing the first instruction by performing the operation and sending the result to a target specified by the at least one target operand field;

fetching and decoding a native, second instruction stored at a different, second address in the instruction cache or main memory coupled to the processor, the second instruction being encoded in two words of the instruction cache or main memory, the first word of the two words including an opcode field encoding the same opcode as the first instruction specifying the same operation as performed by the first instruction and an extended opcode indicating that a target operand is encoded in a second word of the two words of the instruction cache or main memory, the second word specifying at least one extended target for sending a result of the operation associated with the second instruction;

based on decoding the extended opcode, decoding the target operand encoded in the second word; and executing the second instruction by performing the operation and sending the result to the specified at least one extended target.

12. The method of claim 11, wherein the decoding comprises:
determining the at least one target based at least in part on a relative location of the decoded instruction within the instruction cache or main memory and/or a relative location of the decoded instruction within a portion of the instruction cache or main memory.

13. The method of claim 11, wherein the decoding comprises:
determining the specified at least one target based at least in part on a vector.

14. The method of claim 11, wherein the decoding comprises:
decoding data indicating a number of target operands having a particular type; and
determining target locations to send data for the target operands of the particular type.

15. The method of claim 11, wherein the decoding comprises:
determining types of target instruction operands, the types being selected from the group consisting of: target instruction, broadcast channel, register, and memory.

16. The method of claim 11, wherein the instruction is a register read.

17. The method of claim 11, wherein the second, different word may be optionally encoded for a native instruction having the same opcode.

18. The method of claim 11, wherein the first instruction further includes a first field specifying the number of target operand fields in the first instruction, and the second instruction includes a second field specifying the number of target operand fields in the second instruction, the first and second fields specifying different numbers of target operand fields.

19. One or more computer-readable storage media storing computer-readable instructions for an instruction block that when executed by a processor, cause the processor to perform a method, the computer-readable instructions comprising:
instructions for analyzing source code and/or object code to determine operand dependencies for the instruction block; and
instructions for transforming the source code and/or object code into computer-executable code for the instruction block, the computer-executable code including:
a first native instruction encoded in a variable-length format stored in the instruction block as a single word having a predetermined number of bits, the first native instruction having an opcode encoded in a fixed opcode field location and at least one encoded target operand field, and
a second native instruction encoded in the variable-length format stored in the instruction block as a plurality of words, each of the words having the same predetermined number of bits, the second native instruction having the same opcode encoded in the fixed opcode field and a different number of at least two encoded target operand fields in the plurality of words.

20. The computer-readable storage media of claim 19, wherein the instructions further comprise:
instructions for assigning priorities to the target operands of the second native instruction; and
instructions for arranging the target operands of the second native instruction so that higher priority target operands will be sent to their target instructions before lower priority target operands.

21. The computer-readable storage media of claim 19, wherein the instructions further comprise:
instructions for reordering target instructions such that all the target instructions for the second native instruction will be all located within a portion of the instruction block that can be addressed by the sending instruction.

22. The computer-readable storage media of claim 19, wherein the second native instruction further comprises an extended opcode field having a different number of target operand fields than the first instruction target operand field.

* * * * *